(12) United States Patent
Kotake et al.

(10) Patent No.: US 11,220,579 B2
(45) Date of Patent: Jan. 11, 2022

(54) SOL COMPOSITION

(71) Applicant: HITACHI CHEMICAL COMPANY, LTD., Tokyo (JP)

(72) Inventors: Tomohiko Kotake, Tokyo (JP); Masato Miyatake, Tokyo (JP); Hikari Murai, Tokyo (JP)

(73) Assignee: SHOWA DENKO MATERIALS CO., LTD., Tokyo (JP)

(*) Notice: Subject to any disclaimer, the term of this patent is extended or adjusted under 35 U.S.C. 154(b) by 0 days.

(21) Appl. No.: 16/874,378

(22) Filed: May 14, 2020

(65) Prior Publication Data

US 2020/0277443 A1    Sep. 3, 2020

Related U.S. Application Data

(60) Continuation of application No. 16/141,155, filed on Sep. 25, 2018, now Pat. No. 10,738,165, which is a division of application No. 15/121,668, filed as application No. PCT/JP2015/055371 on Feb. 25, 2015, now Pat. No. 10,563,016.

(30) Foreign Application Priority Data

Feb. 26, 2014 (JP) ................. 2014-035155
Jan. 27, 2015 (JP) ................. 2015-013371

(51) Int. Cl.
*C08G 77/14* (2006.01)
*C08L 83/06* (2006.01)
*C08J 9/28* (2006.01)
*F16L 59/02* (2006.01)

(52) U.S. Cl.
CPC .............. *C08G 77/14* (2013.01); *C08J 9/283* (2013.01); *C08L 83/06* (2013.01); *F16L 59/028* (2013.01); *C08J 2383/06* (2013.01)

(58) Field of Classification Search
None
See application file for complete search history.

(56) References Cited

U.S. PATENT DOCUMENTS

| | | |
|---|---|---|
| 4,374,933 A | 2/1983 | Scholze et al. |
| 4,402,927 A | 9/1983 | Von Dardel et al. |
| 4,680,048 A | 7/1987 | Motoki et al. |
| 5,207,814 A | 5/1993 | Cogliati et al. |
| 5,496,527 A | 3/1996 | Yokogawa et al. |

(Continued)

FOREIGN PATENT DOCUMENTS

| | | |
|---|---|---|
| EP | 3199493 A1 | 8/2017 |
| JP | H6-219726 A | 8/1994 |

(Continued)

OTHER PUBLICATIONS

Hüsing et al. "Novel siloxane-silica nanocomposite aerogels and xerogels." Journal of sol-gel science and technology 26, No. 1-3 (2003): 73-76. (Year: 2003).*

(Continued)

*Primary Examiner* — Robert S Loewe
(74) *Attorney, Agent, or Firm* — Fitch, Even, Tabin & Flannery, L.L.P.

(57) ABSTRACT

A sol composition for aerogel formation including a hydrolysis product of a polysiloxane compound.

13 Claims, 4 Drawing Sheets

(56) References Cited

U.S. PATENT DOCUMENTS

| | | | |
|---|---|---|---|
| 5,525,643 A * | 6/1996 | Macip-Boulis | B01J 13/00 521/154 |
| 5,624,997 A * | 4/1997 | Liles | C08J 3/03 524/785 |
| 5,830,387 A | 11/1998 | Yokogawa et al. | |
| 9,309,369 B1 | 4/2016 | Meador | |
| 2002/0025900 A1 | 2/2002 | Hsu et al. | |
| 2004/0076840 A1 * | 4/2004 | Akamatsu | C03C 17/30 428/451 |
| 2005/0022697 A1 * | 2/2005 | Benrashid | H01L 21/02126 106/287.13 |
| 2007/0004306 A1 | 1/2007 | Lesser et al. | |
| 2008/0206545 A1 * | 8/2008 | Chang | C01B 33/155 428/312.6 |
| 2011/0114414 A1 | 5/2011 | Bliton et al. | |
| 2013/0338247 A1 | 12/2013 | Leventis et al. | |
| 2014/0134415 A1 | 5/2014 | Gong et al. | |
| 2014/0302130 A1 * | 10/2014 | Reategui | A61K 35/12 424/451 |
| 2016/0258153 A1 * | 9/2016 | Koebel | C01B 33/145 |

FOREIGN PATENT DOCUMENTS

| | | | | |
|---|---|---|---|---|
| JP | H7-185306 A | | 7/1995 | |
| JP | H09-109323 A | | 4/1997 | |
| JP | H10-72212 A | | 3/1998 | |
| JP | 2000-026609 A | | 1/2000 | |
| JP | 2000038451 A | * | 2/2000 | C08G 77/38 |
| JP | 2000-129127 A | | 5/2000 | |
| JP | 2001-179866 A | | 7/2001 | |
| JP | 2003-231755 A | | 8/2003 | |
| JP | 2004-203632 A | | 7/2004 | |
| JP | 2004203632 A | * | 7/2004 | C03C 17/30 |
| JP | 2011-093744 A | | 5/2011 | |
| JP | 2012-233110 A | | 11/2012 | |
| JP | 5250900 B2 | | 4/2013 | |
| WO | 2007/010949 A1 | | 1/2007 | |
| WO | 2014/132652 A1 | | 9/2014 | |
| WO | 2016/121757 A1 | | 8/2016 | |

OTHER PUBLICATIONS

Li et al., "Flexible nanofiber-reinforced aerogel (xerogel) synthesis, manufacture, and characterization", ACS applied materials & interfaces 1, No. 11 (2009): 2491-2501. (Year: 2009).*

Makarova et al. "Synthesis of organosilicon alcohols by condensation of 1, 1-dimethylsila-2, 5-dioxacyclohexane with silanols" Bulletin of the Academy of Sciences of the USSR, Division of chemical science 38, No. 11 (1989): 2405-2409. (Year: 1989).*

Machine translation of JP-200038451, translation generated Oct. 2020, 13 pages. (Year: 2020).*

Zhang et al. "One-step sol-gel preparation of PDMS-silica ORMOSILs as environment-resistant and crack-free thick antireflective coatings." Journal of Materials Chemistry 22, No. 26 (2012): 13132-13140. (Year: 2012).*

Machine translation of JP-2004203632, translation generated Mar. 2021, 10 pages. (Year: 2021).*

Search Report of EP Patent Application No. 15755570.7 dated Oct. 10, 2017 in English.

International Preliminary Report on Patentability of Appln. No. WO PCT/JP2015/055371 dated Sep. 9, 2016 in English.

Wong et al. "Mechanical properties of monolithic silica aerogels made from polyethoxydisiloxanes" Microporous and Mesoporous Materials 183, 2014, 23-29. (Year: 2014).

Nadargi et al. "Studies on rheological properties of methyltriethoxysilane (MTES) based flexible superhydrophobic silica aerogels" Microporous and Mesoporous Materials, 117, 2009, 617-626. (Year: 2009).

Hu et al. "Ultralight and Highly Compressible Graphene Aerogels" Adv. Mater. 2013, 25, 2219-2223. (Year: 2013).

Liao et al. "Engineering thermal and mechanical properties of flexible fiber-reinforced aerogel composites" J Sol-Gel Sci Technol, 2012, 63, 445-456 (Year: 2012).

Sun et al. "Multifunctional, Ultra-Flyweight, Synergistically Assembled Carbon Aerogels" Adv. Mater. 2013, 25, 2554-2560. (Year: 2013).

Hayase et al. "New flexible aerogels and xerogels derived from methyltrimethoxysilane/dimethyldimethoxysilane co-precursors" J. Mater. Chem. 2011, 21, 17077-17079. (Year: 2011).

Randall et al., "Polymer reinforced silica aerogels: effects of dimethyldiethoxysilane and bis(trimethoxysilylpropyl) amine as silane precursors", J. Mater. Chem. A., 2013, 1, pp. 6642-6652 (Cited in Office Action dated Oct. 31, 2018 for U.S. Appl. No. 15/121,668).

Okamoto K. et al., Laminated Insulating Material, Apr. 28, 1997, machine translation of JP09109323 (Year: 1997) (Cited in Office Action dated Feb. 1, 2019, in U.S. Appl. No. 15/756,878).

Shibata, T. et al., Heat Insulating Structure Comprising Aerogel, Sep. 4, 2014, machine translation of WO2014132652 (Year: 2014) (Cited in Office Action dated Feb. 1, 2019, in U.S. Appl. No. 15/756,878).

* cited by examiner

SOL COMPOSITION

CROSS-REFERENCE TO RELATED APPLICATIONS

This application is a continuation of U.S. Ser. No. 16/141,155 filed in the U.S. on Sep. 25, 2018, which is a divisional of U.S. Ser. No. 15/121,668, filed in the U.S. on Aug. 25, 2016, which is a national phase application filed under 35 U.S.C. § 371 of International Application No. PCT/JP2015/055371, filed on Feb. 25, 2015, which claims priority from Japanese Patent Application No. 2015-013371, filed Jan. 27, 2015, and Japanese Patent Application No. 2014-035155, filed Feb. 26, 2014, the entire content of each of which are hereby incorporated herein by reference.

TECHNICAL FIELD

The present invention relates to an aerogel having excellent thermal insulation and productivity.

BACKGROUND ART

Silica aerogel is known as a material having small thermal conductivity and thermal insulation. Silica aerogel is useful as a functional material having excellent functionalities (e.g., thermal insulation), unique optical properties, and unique electric properties and is, for example, used among others as an electronic substrate material that utilizes the super-low permittivity characteristics of the silica aerogel, as a thermal insulation material that utilizes the high thermal insulating property of the silica aerogel, or as a light reflecting material that utilizes the super-low reflective index of the silica aerogel.

As a process for producing such silica aerogel, there is known a supercritical drying method by which alkoxysilane is hydrolyzed and polymerized, and the obtained gel compound (alcogel) is dried under the supercritical conditions of a dispersion medium: for example, Patent Literature 1 should be referred to. The supercritical drying method is a method for removing a solvent contained in the alcogel which comprises introducing the alcogel and the dispersion medium (the solvent for use in drying) into a pressurized container and applying to the dispersion medium, a temperature and pressure above its critical point to generate a supercritical fluid. However, since the supercritical drying method requires a high pressure process, capital investments in special devices and others that can endure the supercriticality are necessary, and also simultaneously, much time and effort are needed.

Therefore, a technique has been proposed that an alcogel is dried by employing a commonly used method which does not require the high pressure process. As such method, there is, for example, known a method by which monoalkyltrialkoxysilane and tetraalkoxysilane as raw gel materials are combined at a specific ratio to improve the strength of the gel to be obtained and it is dried under normal pressure: for example, Patent Literature 2 should be referred to. However, when such normal pressure drying is employed, the gel tends to shrink because of the stress resulting from the capillarity within the alcogel.

CITATION LIST

Patent Literature

Patent Literature 1: U.S. Pat. No. 4,402,927B
Patent Literature 2: Japanese Unexamined Patent Publication No. 2011-93744

SUMMARY OF INVENTION

Technical Problem

While the problems that have been inherent in the conventional production processes are thus examined from different viewpoints, their productivities remain to be problems to be solved because even if either of the above-described processes is employed, the obtained aerogels are poor in handling and the scale-up of the processes will be difficult. For example, there are cases where the aerogels in agglomerated form obtained by the above-described processes are damaged simply when they are touched with hands to be lifted up. This is inferred to arise from that the densities of the aerogels are low and the aerogels have pore structures which comprise only fine particles on the order of 10 nm being weekly linked.

The technique for improving such problems that the conventional aerogels have is thought to be a method by which the pore diameter of the gel is allowed to be large to the level of a micro meter scale and the gel is thus imparted with flexibility. However, there is a problem that the thermal conductivity of the thus-obtained aerogel increases drastically, and the excellent thermal insulation of the aerogel is lost.

The present invention has been made in view of the above-described circumstances and has an objective of providing an aerogel having excellent thermal insulation and productivity.

Solution to Problem

As a result of having repeated diligent studies in order to accomplish the above-described objective, the present inventors discovered that any aerogel having a specific range of thermal conductivity as well as having a specific range of compressive elasticity modulus displayed excellent thermal insulation, while improving the handling, which enabled the production scale-up and thus could increase the productivity, leading to the completion of the present invention.

The present invention provides an aerogel having a thermal conductivity of 0.03 W/m·K or less and a compressive elasticity modulus of 2 MPa or less at 25° C. under atmospheric pressure. Specifically, the aerogel of the present invention is excellent in thermal insulation and productivity since it has a specific range of thermal conductivity as well as a specific range of compressive elasticity modulus as opposed to the aerogels produced according to the prior art. Thereby, excellent thermal insulation is displayed while the handling of the aerogel is improved to enable the production scale-up and thus the productivity can be increased.

The aerogel of the present invention allows its recovery rate from deformation to be 90% or more. Such aerogel can possess more excellent flexibility.

The aerogel of the present invention allows its maximum compressive deformation rate to be 80% or more. Such aerogel can posses more excellent flexibility.

The present invention provides an aerogel wherein a ratio Q+T:D of a signal area derived from Q and T to a signal area derived from D is from 1:0.01 to 1:0.5 when in a solid $^{29}$Si-NMR spectrum as measured by using DD/MAS method, silicon-containing bonding units of Q, T, and D are defined as described below, providing that an organic group is a mono-valent organic group where an atom bonded to a silicon atom is a carbon atom in what follows,
wherein Q: a silicon-containing bonding unit comprising four oxygen atoms that are bonded to one silicon atom;

T: a silicon-containing bonding unit comprising three oxygen atoms and one hydrogen atom or one mono-valent organic group that are bonded to one silicon atom; and D: a silicon-containing bonding unit comprising two oxygen atoms and two hydrogen atoms or two mono-valent organic groups that are bonded to one silicon atom.

The present invention provides an aerogel having a structure represented by general formula (1) described below. Such aerogel is excellent in thermal insulation and productivity. The aerogel may easily be controlled at a specific range of thermal conductivity as well as at a specific range of compressive elasticity modulus by introducing the structure represented by the general formula (1) into its skeleton.

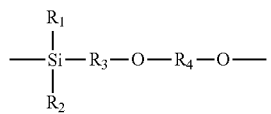
(1)

wherein in the formula (1), $R_1$ and $R_2$ each independently represents an alkyl group or an aryl group and $R_3$ and $R_4$ each independently represents an alkylene group.

The present invention provides an aerogel having a ladder type structure provided with a strut and a bridge, the bridge represented by general formula (2) described below. Such aerogel has excellent flexibility resulting from the ladder structure while maintaining the thermal insulation of its own. The aerogel may easily be controlled at a specific range of thermal conductivity as well as at a specific range of compressive elasticity modulus by introducing the thus-mentioned structure into its skeleton.

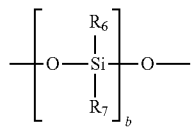
(2)

wherein in the formula (2), $R_6$ and $R_7$ each independently represents an alkyl group or an aryl group and "b" represents an integer of from 1 to 50.

Further, as the aerogel having a ladder type structure, there is mentioned that which has a structure represented by general formula (3) described below. This allows more excellent thermal insulation and flexibility to be attained.

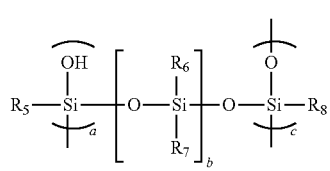
(3)

wherein in the formula (3), $R_5$, $R_6$, $R_7$, and $R_8$ each independently represents an alkyl group or an aryl group;

"a" and "c" each independently represents an integer of from 1 to 3,000; and "b" represents an integer of from 1 to 50.

The present invention also provides an aerogel from drying a wet gel, the wet gel being formed from a sol comprising at least one member selected from the group consisting of a polysiloxane compound having a reactive group within a molecule thereof and a hydrolyzed product of said polysiloxane compound. The thus-obtained aerogel is excellent in thermal insulation and productivity. In addition, the aerogel may easily be controlled at a specific range of thermal conductivity as well as at a specific range of compressive elasticity modulus by being obtained as such.

Further, the aerogel described above may be from drying a wet gel, the wet gel being formed from a sol comprising at least one member selected from the group consisting of a polysiloxane compound having a reactive group within a molecule thereof and a hydrolyzed product of said polysiloxane compound.

Here, as the reactive group, a hydroxyalkyl group is mentioned, and the carbon number of said hydroxyalkyl group can be from 1 to 6. This result in an aerogel having more excellent thermal insulation and flexibility.

In addition, when the reactive group is a hydroxyalkyl group, the above-described polysiloxane compounds include those represented by general formula (4) described below. This allows more excellent thermal insulation and flexibility to be attained.

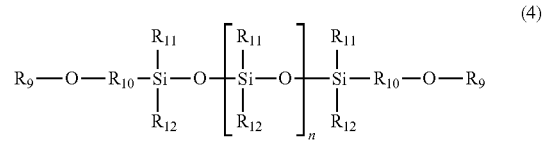
(4)

wherein in the formula (4), $R_9$ represents a hydroxyalkyl group; $R_{10}$ represents an alkylene group; $R_{11}$ and $R_{12}$ each independently represents an alkyl group or an aryl group; and "n" represents an integer of from 1 to 50.

In the present invention, as the reactive group, an alkoxy group is also mentioned, and the carbon number of said alkoxy group can be from 1 to 6. This results in an aerogel having more excellent thermal insulation and flexibility.

In addition, when the reactive group is an alkoxy group, the polysiloxane compounds include those represented by general formula (5) described below. This allows more excellent thermal insulation and flexibility to be attained.

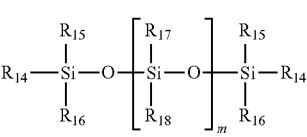
(5)

wherein in the formula (5), $R_{14}$ represents an alkyl group or an alkoxy group; $R_{15}$ and $R_{16}$ each independently represents an alkoxy group; $R_{17}$ and $R_{18}$ each independently represents an alkyl group or an aryl group; and "in" represents an integer of from 1 to 50.

In the present invention, the above-described sol may further comprise at least one member selected from the group consisting of a silicone compound having a hydrolyzable functional group within a molecule thereof and a hydrolyzed product of said silicone compound. This allows more excellent thermal insulation and productivity to be attained.

The above-described drying can also be carried out at a temperature of less than a critical point of a solvent to be used in the drying and under atmospheric pressure, which may be supercritical drying. Thereby, an aerogel that is excellent in thermal insulation and productivity can further be easily obtained.

Advantageous Effects of Invention

According to the present invention, there can be provided an aerogel that is excellent in thermal insulation and productivity. Specifically, the aerogel having a specific range of thermal conductivity as well as a specific range of compressive elasticity modulus displays excellent thermal insulation, while improving the handling, which enables the production scale-up and can increase the productivity. There has been thus far no report on the aerogel having a specific range of thermal conductivity as well as a specific range of compressive elasticity modulus as defined above; the present invention has a potential where it can be utilized in a variety of usages.

DESCRIPTION OF EMBODIMENTS

Preferred embodiments of the present invention will be hereinbelow described in detail while referring to the figures where necessary. However, the present invention is not to be limited to the embodiments as described below.
<Aerogels>

In accordance with the narrow definition against wet gels, the dry gels obtained using the supercritical drying method are referred to as aerogels; the dry gels obtained using drying under atmospheric pressure are referred to as xerogels; and the dry gels obtained using freeze drying are referred to as cryogels. However, in the present embodiments, the dry gel with a low density obtained regardless of any of these drying methods for the wet gel will be referred to as an aerogel. Specifically, the aerogel of the present embodiment is an aerogel in the broad definition, which implies a gel comprised of a microporous solid in which the dispersed phase is a gas. Generally, the interior of an aerogel comprises a reticulate fine structure and has a cluster structure where aerogel particles of the order of 2-20 nm are bonded. There are fine pores that are less than 100 nm between the skeletons formed by this cluster, leading to a fine porous structure three-dimensionally. Further, the aerogels in the present embodiments are silica aerogels comprising silica as the principal component. As the silica aerogel, there is mentioned an aerogel of the so-called organic-inorganic hybridized type. The aerogels of the present embodiments are those which are excellent in thermal insulation and productivity (flexibility).

[Thermal Conductivity]

The aerogel of the present embodiment has a thermal conductivity of 0.03 W/m·K or less at 25° C. under atmospheric pressure. The thermal conductivity even may be 0.025 W/m·K or less and may be 0.02 W/m·K or less. If the thermal conductivity is 0.03 W/m·K or less, it will be possible to obtain thermal insulation that is greater than that of a polyurethane foam which is a high performance insulating material. Note that the lower limit of thermal conductivity is not particularly restricted, but it can be, for example, set at 0.01 W/m·K.

Figure 1:
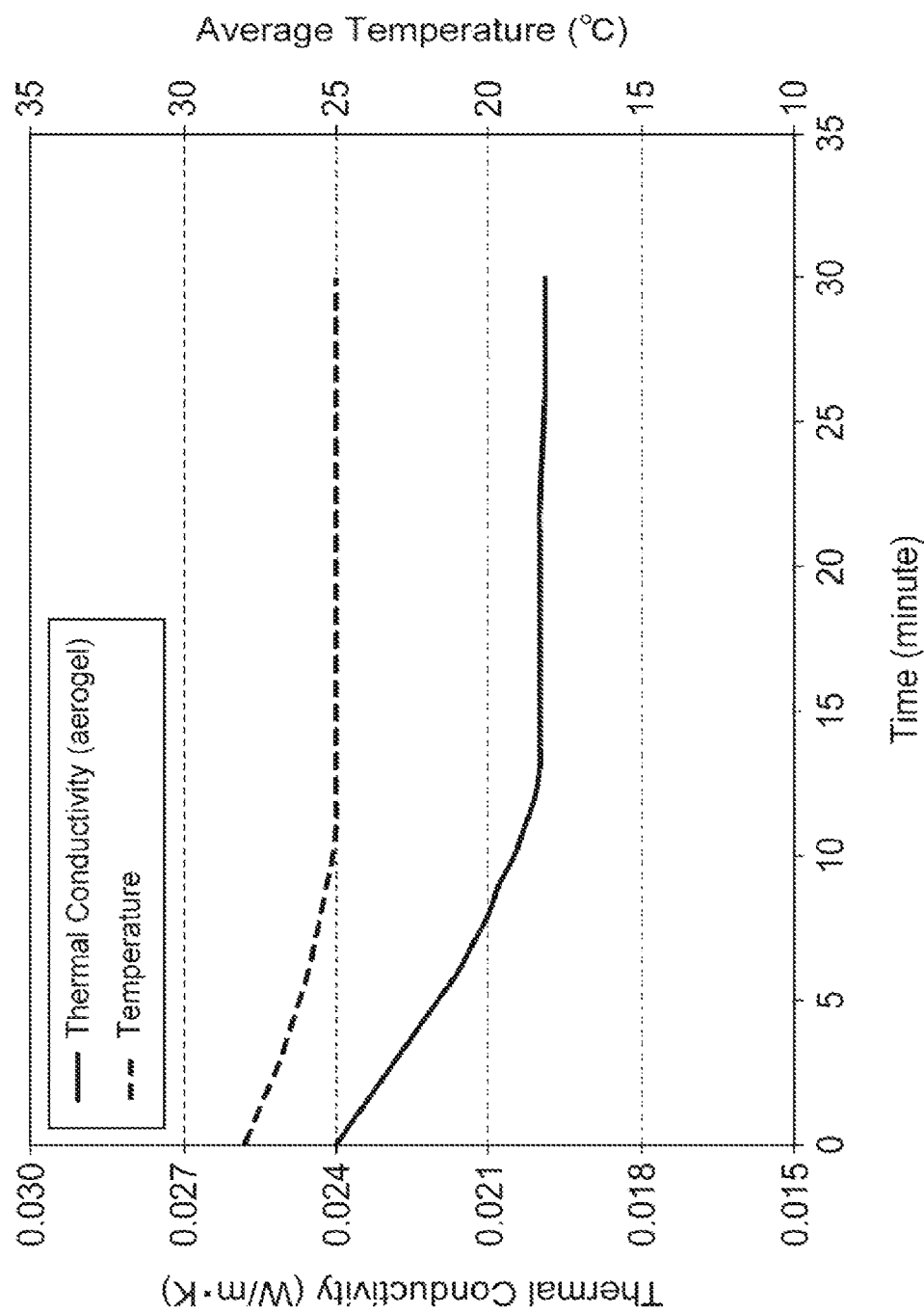
FIG. 1 is a chart of measurement obtained when the thermal conductivity of an aerogel of the present embodiment was measured under atmospheric pressure by using a steady state thermal conductivity measuring device.

The thermal conductivity can be measured by the steady state method. Concretely, measurement can be made using a steady state thermal conductivity measuring device "FM436Lambda" (product name; HFM436Lambda being a registered trademark: manufactured by NETZSCH GmbH & Co.). FIG. 1 is a diagram showing a chart of measurement obtained when the thermal conductivity of the aerogel of Example 10 to be described later was measured under atmospheric pressure by using this steady state thermal conductivity measuring device. According to FIG. 1, it is understood that the aerogel of the present example which was actually measured has a thermal conductivity of 0.020 W/m·K at 25° C.

The outline of the method of measuring thermal conductivity with the steady state thermal conductivity measuring device is as follows.
(Preparation of Sample for Measurement)

By using a blade with an edge angle of from about 20 to 25 degrees, an aerogel is processed into a size of from 150×150×100 mm$^3$ to make a sample for measurement. Note that in HFM436 Lambda the recommended sample size is 300×300×100 mm$^3$; however, it was already ascertained that the thermal conductivity as measured with the sample size proved to be at the same level as the thermal conductivity as measured with the recommended sample size. If necessary, the sample for measurement is next shaped with sandpaper of #1500 and above to secure the parallelism of the surfaces. Further, prior to the measurement of thermal conductivity, a constant temperature drying oven "DVS402" (product name: manufactured by Yamato Scientific Co. Ltd) is used to dry the sample for measurement at 100° C. for 30 minutes under atmospheric pressure. The sample for measurement is then transferred into a desiccator and is cooled to 25° C. This allows the sample for the thermal conductivity measurement to be obtained.
(Method of Measurement)

The measurement conditions are at an average temperature of 25° C. and under atmospheric pressure. The sample for measurement obtained as described above is sandwiched between an upper heater and a lower heater at a load of 0.3 Pa to set a temperature differential ΔT of 20° C. and is adjusted such that one-dimensional heat flow is formed by a guard heater, while the upper surface temperature and the lower surface temperature of the sample for measurement are measured. Then, thermal resistance $R_S$ of the sample for measurement is determined according to the following equation:

$$R_S = N((T_U - T_L)/Q) - R_O$$

wherein $T_U$ represents an upper surface temperature of the sample for measurement; $T_L$ represents a lower surface temperature of the sample for measurement; $R_O$ represents a contact thermal resistance of an interface between the upper and lower surfaces; and Q represents an output of a heat flux meter. Note that N is a proportionality coefficient and is determined in advance by using a calibration sample.

Thermal conductivity λ of the sample for measurement is determined from the obtained thermal resistance $R_S$ according to the following equation:

$$\lambda = d/R_S$$

wherein "d" represents a thickness of the sample for measurement.

[Compressive Elasticity Modulus]

The aerogel of the present embodiment has a compressive elasticity modulus of 2 MPa or less at 25° C. Further, the compressive elasticity modulus may be 1 MPa or less and may be 0.5 MPa or less. If the compressive elasticity modulus is 2M Pa or less, the aerogel whose handling is excellent can result. In addition, the lower limit of the compressive elasticity modulus is not particularly restricted but can, for example, be 0.05 MPa.

[Recovery Rate from Deformation]

The aerogel of the present embodiment can have a recovery rate from deformation to be 90% or more at 25° C. Further, the recovery rate from deformation may be 94% or more and may be 98% or more. If the recovery rate from deformation is 90% or more, it will be easier to obtain excellent strength, excellent flexibility against deformation, and the like. In addition, the upper limit of the recovery rate from deformation is not particularly restricted but can, for example, be 100% and even be 99%.

[Maximum Compressive Deformation Rate]

The aerogel of the present embodiment can have a maximum compressive deformation rate to be 80% or more at 25° C. Further, the maximum compressive deformation rate may be 83% or more and may be 86% or more. If the maximum compressive deformation rate is 80% or more, it will be easier to obtain excellent strength, excellent flexibility against deformation, and the like. In addition, the upper limit of the maximum compressive deformation rate is not particularly restricted but can, for example, be 90%.

These compressive elasticity modulus, recovery rate from deformation, and maximum compressive deformation rate can be measured using a small size desk top type tester "EZTest" (product name: manufactured by Shimadzu Corporation). The outline of the method of measuring the compressive elasticity modulus and others, which employs the small size desk top type tester, is as follows.

(Preparation of Sample for Measurement)

By using a blade with an edge angle of from about 20 to about 25 degrees, an aerogel is processed into a cube of 7.0 mm square (in dice form) to make a sample for measurement. If necessary, the sample for measurement is next shaped with sandpaper of #1500 and above to secure the parallelism of surfaces. Further, prior to the measurement, the constant temperature drying oven "DVS402" (product name: manufactured by Yamato Scientific Co. Ltd.) is used to dry the sample for measurement at 100° C. for 30 minutes under atmospheric pressure. The sample for measurement is then transferred into a desiccator and is cooled to 25° C. Thereby, the samples for measurement of the compressive elasticity modulus, recovery rate from deformation, and maximum compressive deformation are obtained.

(Method of Measurement)

A load cell with 500 N is to be used. Also, an upper platen (ϕ 20 mm) and a lower platen (ϕ 118 mm), which are made of stainless steel, are used as compression measurement jigs. The sample for measurement is set between the jigs, and compression is carried out at a rate of 1 mm/min, where the deviation in the size of the sample for measurement at 25° C. is measured. The measurement is caused to end at a point that a load exceeding 500 N is applied or the sample for measurement is destroyed. Here, compressive strain ε can be determined according to the following equation:

$$\varepsilon = \Delta d/d1$$

wherein Δd represents a deviation (mm) in the thickness of the sample for measurement under load and d1 represents a thickness (mm) of the sample for measurement before the load is applied.

Further, compressive stress σ (MPa) can be determined according to the following equation:

$$\sigma = F/A$$

wherein F represents compressive force (N) and A represents a cross section area (mm²) of the sample for measurement before the load is applied.

Figure 2:
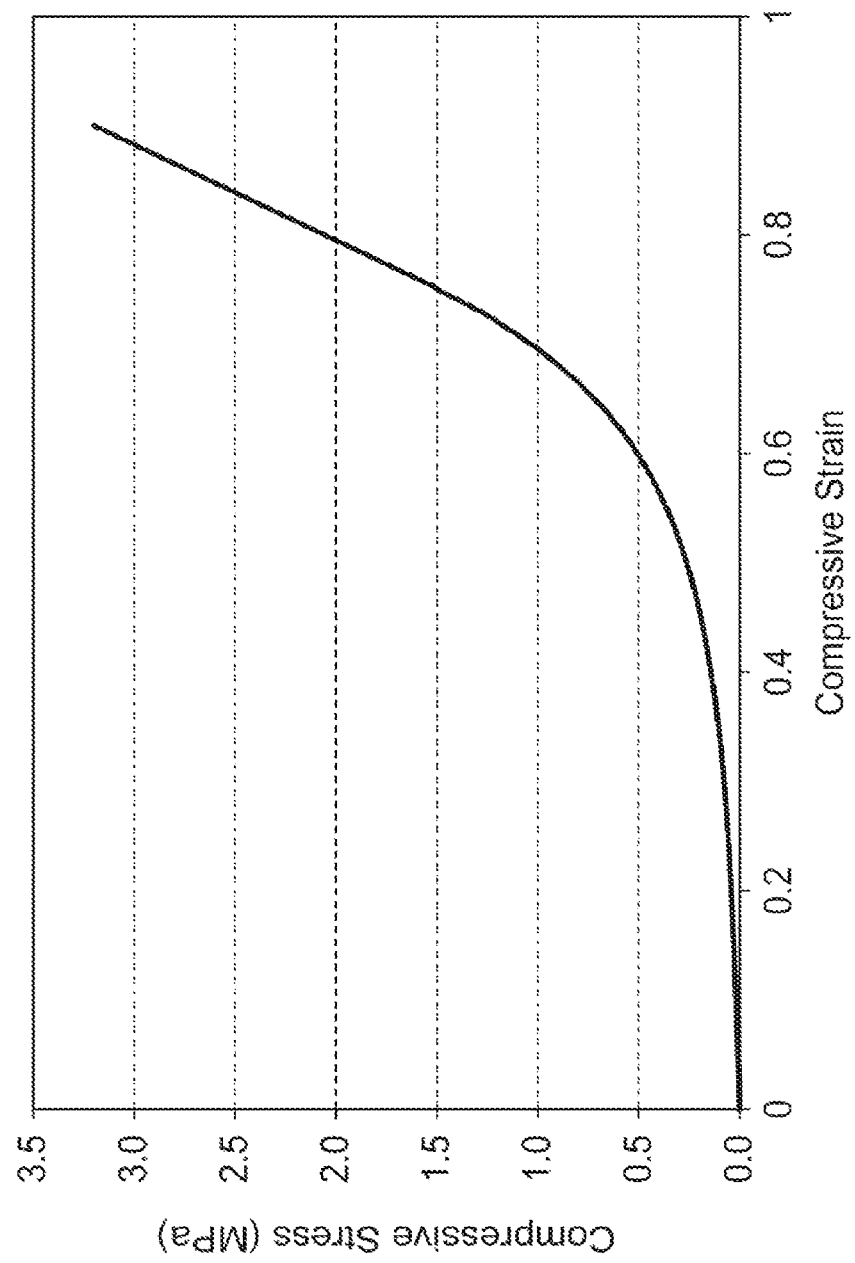
FIG. 2 is a stress-distortion curve obtained when the aerogel of the present invention with a compressive elasticity modulus of 0.20 MPa was measured.

FIG. 2 is a diagram showing a curve of compressive stress-compressive strain of the aerogel of the present Example 1 to be described later. Further, compressive elasticity modulus E (MPa) can be determined, for example, in the range of compressive force being from 0.1 to 0.2 N according to the following equation:

$$E = (\sigma_2 - \sigma_1)/(\varepsilon_2 - \varepsilon 1)$$

wherein $\sigma_1$ represents compressive stress (MPa) measured when the compressive force is 0.1 N; $\sigma_2$ represents compressive stress (MPa) measured when the compressive force is 0.2 N; $\varepsilon_1$ represents compressive strain measured when the compressive stress is $\sigma_1$; and $\varepsilon_2$ is compressive strain measured when the compressive stress is $\sigma_2$.

According to FIG. 2 and the above equation, it is found that the aerogel of the present Example, which has been actually subjected to the measurement, has a compressive elasticity modulus of 0.20 MPa at 25° C.

On the other hand, the recovery rate from deformation and the maximum compressive deformation rate can be calculated according to the equation described below, providing that the thickness of a sample for measurement before the load is applied is d1, the thickness of the sample for measurement at a point that a maximum load of 500 N is applied or the sample for measurement is destroyed is d2, and the thickness of the sample for measurement after the load has been removed is d3.

Recovery rate from deformation=$(d3-d2)/(d1-d2)\times 100$

Maximum compressive deformation rate=$(d1-d2)/d1 \times 100$

Moreover, these thermal conductivity, compressive elasticity modulus, recovery rate from deformation, and maximum compressive deformation rate can be appropriately adjusted by changing the production conditions of the aerogel, staring materials and the like.

[Signal Areas Relating to Silicon-Containing Bonding Units Q, T, and T]

The aerogel of the present embodiment can be such that a ratio Q+T:D (signal area ratio) of a signal area derived from Q and T to a signal area derived from D is from 1:0.01 to 1:0.5 when in a solid $^{29}$Si-NMR spectrum as measured by using the DD/MAS method, silicon-containing bonding units of Q, T, and D are defined as described below. Further, the signal area ratio may be set at from 1:0.01 to 1:0.3, at from 1:0.02 to 1:0.2, or at from 1:0.03 to 1:0.1. If the signal area ratio is set at 1:0.01 or more, more excellent flexibility will tend to be easily obtained; if it is set at 1:0.5 or less, lower thermal conductivity will tend to be easily obtained.

Note that "oxygen atom" in Q, T, and D as described below is mainly an oxygen atom connecting between two silicon atoms but a case where it is an oxygen atom that is possessed by a hydroxyl group and is bonded to a silicon atom is conceivable. Also, "organic group" is a mono-valent organic group where the atom that is bonded to the silicon atom is a carbon atom; for example, there is mentioned an organic group having a carbon number of from 1 to 10 that is unsubstituted or substituted. As the unsubstituted mono-valent organic group, there are mentioned hydrocarbon groups such as an alkyl group, an alkenyl group, an alkynyl group, a cycloalkyl group, an aryl group, and an aralkyl group. Further, as the substituted mon-valent organic group, there are mentioned hydrocarbon groups (substituted organic group) of which hydrogen atom is substituted by a halogen atom, a prescribed functional group, a prescribed functionality-containing organic group, or the like, or alternatively, hydrocarbon groups particularly of which a hydrogen atom in a ring of a cycloalkyl group, an aryl group, an aralkyl group or the like, is substituted by an alkyl group. Furthermore, the halogen atoms include a chlorine atom, a fluorine atom, and the like, which will lead to a halogen atom-containing organic group such as a chloroalkyl group or a polyfluoroalkyl group. The functional groups include a hydroxyl group, a mercapto group, a carboxyl group, an epoxy group, an amino group, a cyano group, an acryloyloxy group, a methacryloxy group, and the like; and the functionality-containing organic groups include an alkoxy group, an acyl group, an acyloxy group, an alkoxycarbonyl group, a glycidyl group, an epoxy cyclohexyl group, an alkylamino group, a di-alkylamino group, an arylamino group, an N-aminoalkyl substituted aminoalkyl group, and the like, respectively.

Q: a silicon-containing bonding unit comprising four oxygen atoms that are bonded to one silicon atom;
T: a silicon-containing bonding unit comprising three oxygen atoms and one hydrogen atom or one mono-valent organic group that are bonded to one silicon atom; and
D: a silicon-containing bonding unit comprising two oxygen atoms and two hydrogen atoms or two mono-valent organic groups that are bonded to one silicon atom.

If the signal area ratio of Q+T:D is within this range, the thermal insulation and the productivity can be enhanced.

The signal area ratio can be confirmed with a solid $^{29}$Si-NMR spectrum. In general, measurement techniques for the solid $^{29}$Si-NMR spectra are not particularly limited. For example, CP/MAS method and DD/MAS method are mentioned, and the present embodiments employ the DD/MAS method from the standpoint of quantitativity.

Meanwhile, Roychen Joseph at al. have reported the structural analysis of composites of colloidal silica and methyl polymethacrylate by using solid $^{29}$Si-NMR in Macromolecules, 1996, 29, pp. 1305-1312. Further, Aramata at al. have reported the interface analysis of silica-siloxane in silicone rubbers by using solid $^{29}$Si-NMR in BUNSEKI KAGAKU, 1998, 47, pp. 971-978. In measuring solid $^{29}$Si-NMR spectra, these reports can be referred to as appropriate.

Chemical shifts of the silicon-containing bonding units Q, T, and D in a solid $^{29}$Si-NMR spectrum are, respectively, observed in the regions where Q unit: from −90 to −120 ppm; T unit: from −45 to −80 ppm; and D unit: from 0 to −40 ppm. Therefore, it is possible to separate the signals of the silicon-containing bonding units Q, T, and D and to calculate the signal area derived from each unit. Note that in analyzing the spectra, it is possible to employ the exponential function as the Window function and at the same time to set the Line Broadening coefficient in the range of from 0 to 50 Hz, from the standpoint of improving the analytical accuracy.

Figure 3:
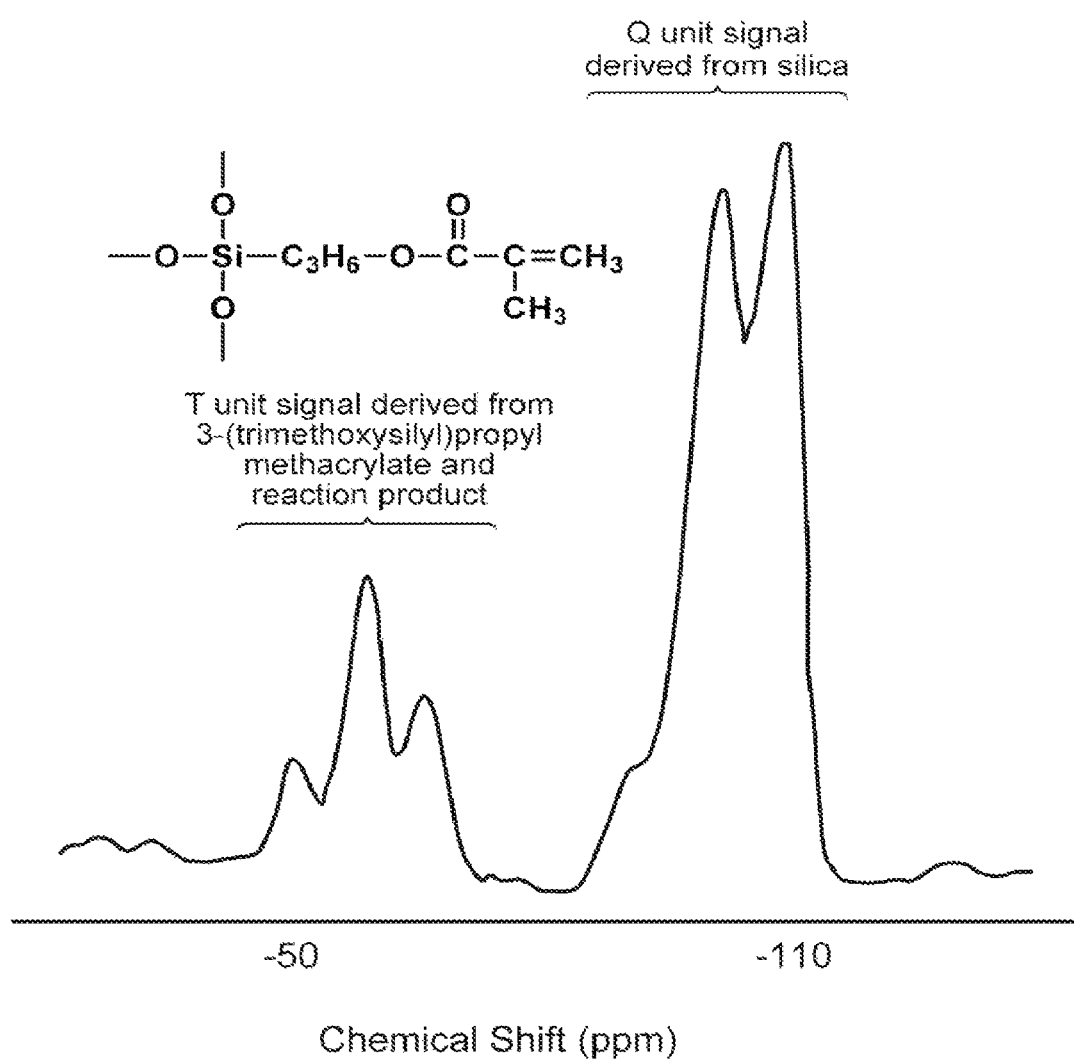
FIG. 3 is a diagram showing a solid $^{29}$Si-NMR spectrum of silica surface-treated with 3-(trimethoxysilyl)propyl methacrylate as measured using DD/MAS method.
Figure 4:
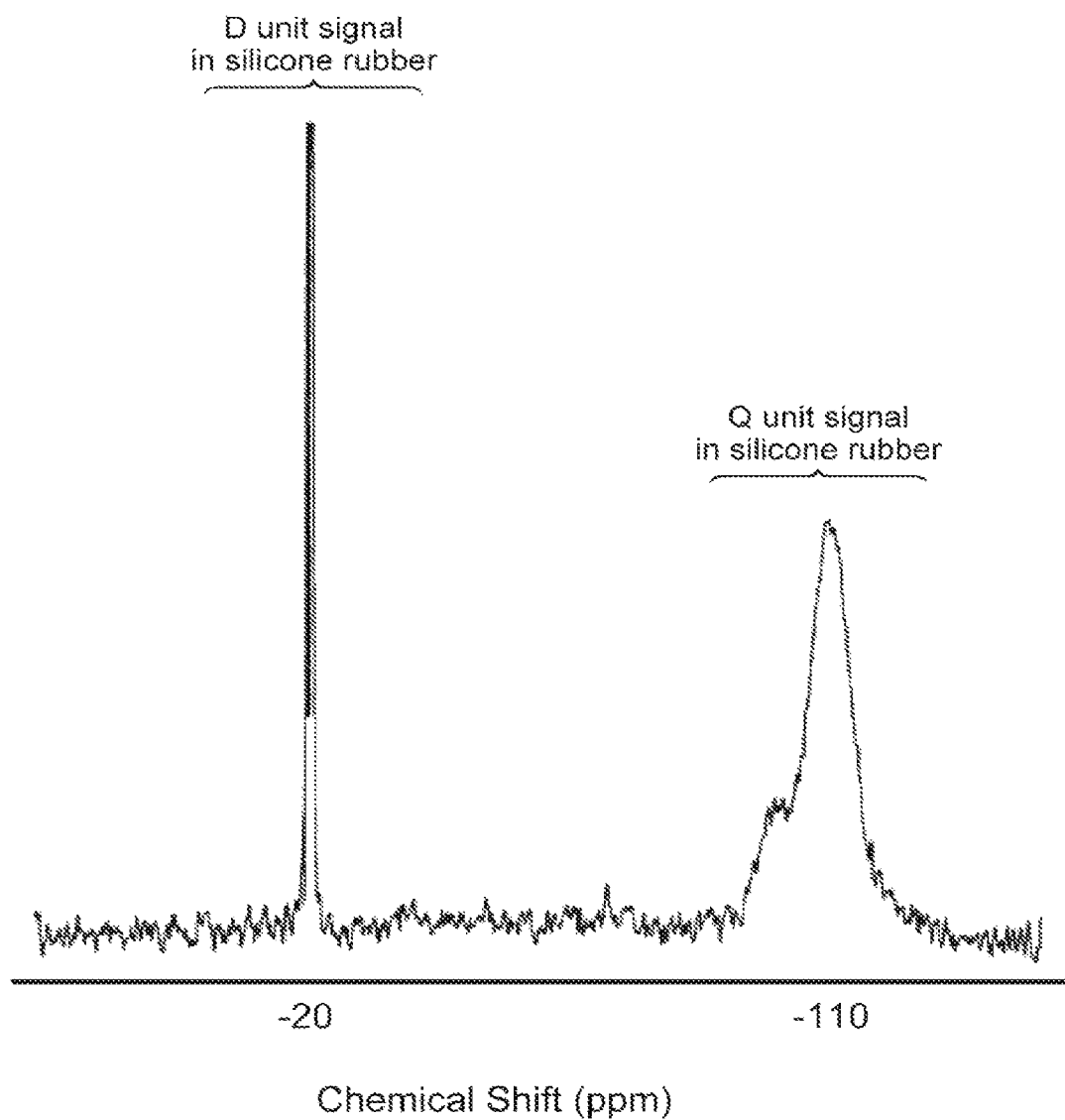
FIG. 4 is a diagram showing a solid $^{29}$Si-NMR spectrum of silicone rubber as measured using the DD/MAS method.

For example, FIG. 3 is a diagram showing a solid $^{29}$Si-NMR spectrum of silica surface-treated with 3-(trimethoxysilyl)propyl methacrylate as measured using the DD/MAS method. Also, FIG. 4 is a diagram showing a solid $^{29}$Si-NMR spectrum of silicon rubber as measured using the DD/MAS method. As FIGS. 3 and 4 show, the separation of silicon-containing bonding units Q, T, and D is possible based on the solid $^{29}$Si-NMR spectra using the DD/MAS method.

Here, the method of calculating the signal area ratios will be described by utilizing FIGS. 3 and 4. For example, in FIG. 3 the Q unit signal derived from silica is observed in the chemical shift range of from −90 to −120 ppm. Also, the T unit signal derived from 3-(trimethoxysilyl)propyl methacrylate and its reaction product is observed in the chemical shift range of from −45 to −80 ppm. Signal areas (integrated values) are obtained by integrating the signals in the respective chemical shift ranges. When the signal area of Q unit is set 1, the signal area ratio of Q:T in FIG. 3 will be calculated to be 1:0.32. Note that the signal areas are calculated with a general spectrum analysis software (such as NMR software "TopSpin" produced by Bruker Inc.; TopSpin is a registered trademark).

Also, In FIG. 4 the Q unit signal in a silicone rubber loaded with fumed silica is observed in the chemical shift range of from −90 to −120 ppm. Further, the D unit signal in the silicone rubber loaded with fumed silica is observed in the chemical shift range of from 0 to −40 ppm. The signal areas (integrated values) are obtained by integrating the signals in the respective chemical shift ranges. When the signal area of the Q unit is set 1, the signal area ratio of Q:D in FIG. 4 will be calculated to be 1:0.04.

[Density and Porosity]

The aerogel of the present embodiment can have the density at 25° C. to be from 0.05 to 0.25 g/cm$^3$ and may further have it to be from 0.1 to 0.2 g/cm$^3$. If the density is 0.05 g/cm$^3$ or more, more excellent strength and flexibility can be obtained; also if it is 0.25 g/cm$^3$ or less, more excellent thermal insulation can be obtained.

The aerogel of the present embodiment can have the porosity at 25° C. to be from 85 to 95% and may further have it to be from 87 to 93%. If the porosity is 85% or more, more excellent thermal insulation can be obtained; also if it is 95% or less, more excellent strength and flexibility can be obtained.

With respect to the aerogel, the central diameters, densities, and porosities of holes (or pores) that are continuously communicating in a three-dimensional reticulate fashion can be measured by the mercury penetration method in accordance with DIN66133.

<Concrete Forms of Aerogels>

The aerogels of the present embodiments include first to third forms as described below. By employing the first to the third form, it will be possible to control the thermal conductivity and the compressive elasticity modulus of the aerogel within specific ranges. Nevertheless, the employment of each of the first to the third forms does not necessarily aim at acquiring an aerogel having a specific range of thermal conductivity as well as a specific range of compressive elasticity modulus which are defined by the present embodiments. By employing each form, an aerogel having a thermal conductivity and a compressive elasticity modulus depending on the each form can be obtained.

(First Form)

The aerogel of the present embodiment can have a structure represented by the following general formula (1):

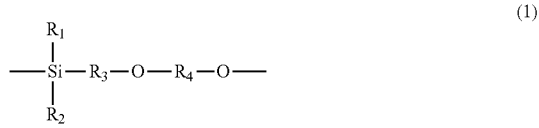

In the formula (1), $R_1$ and $R_2$ each independently represents an alkyl group or an aryl group, and $R_3$ and $R_4$ each independently represents an alkylene group. Here, the aryl groups include a phenyl group, a substituted phenyl group, and others. Further, examples of the substituent in the substituted phenyl group include, an alkyl group, a vinyl group, a mercapto group, an amino group, a nitro group, and a cyano group.

By introducing the above-described structure introduced into the skeleton of an aerogel, the aerogel with low thermal conductivity will result. From such standpoint, in the formula (1) as $R^1$ and $R^2$, there are respectively, independently mentioned an alkyl group having a carbon number of from 1 to 6, a phenyl group, and the like, and as said alkyl group, there is mentioned a methyl group or the like. Also, in the formula (1) as $R^3$ and $R^4$, there are respectively, independently mentioned an alkylene group having a carbon number of from 1 to 6 or the like, and as said alkylene group, there is mentioned an ethylene group, a propylene group, or the like.

(Second Form)

The aerogel of the present embodiment is an aerogel having a ladder type structure that is provided with a strut(s) and a bridge(s) and may be an aerogel of which the bridge is represented by general formula (2) described below. By introducing such ladder type structure into the skeleton of an aerogel, thermal resistance and mechanical strength can be improved. Note that the "ladder type structure" in the present embodiments is that which has two struts and bridges linking the respective struts (i.e., having a form of "ladder"). Although the aerogel skeleton may be comprised of the ladder type structure in the present form, the aerogel may partially have the ladder type structure.

In the formula (2), $R_6$ and $R_7$ each independently represents an alkyl group or an aryl group and "b" represents an integer of from 1 to 50. Here, the aryl groups include a phenyl group, a substituted phenyl group, and others. Further, examples of the substituent in the substituted phenyl group include an alkyl group, a vinyl group, a mercapto group, an amino group, a nitro group, and a cyano group. Further, when "b" is an integer of 2 or more in the formula (2), two or more $R_6$s may, respectively, be identical or different and two or more $R_7$s may, respectively, be identical or different similarly.

By introducing the above-described structure into the skeleton of an aerogel, there will be produced an aerogel having more excellent flexibility than does the aerogel having a structure derived from silsesquioxane of the conventional ladder type (i.e., one having a structure represented by general formula (X) described below) as an example. Note that as is shown by the general formula (X) described below, the structure of the bridge is —O— in the aerogel having a structure derived from silsesquioxane of the conventional ladder type but that the structure of the bridge is a structure represented by the general formula (2) described above (polysiloxane structure) in the aerogel of the present embodiment.

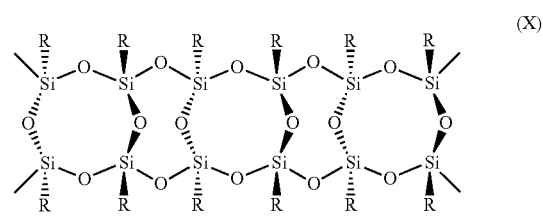

In the formula (X), R represents a hydroxyl group, an alkyl group, or an aryl group.

The structure to be the strut and its chain length, as well as the distance between the structures to be the bridges is not particularly limited; however, as the ladder type structure, there is mentioned a structure represented by general formula (3) described below from the standpoint of improving thermal resistance and mechanical strength.

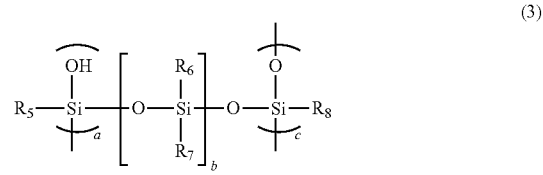

In the formula (3), $R_5$, $R_6$, $R_7$, and $R_8$ each independently represents an alkyl group or an aryl group and "a" and "c" each independently represents an integer of from 1 to 3,000. Here, the aryl groups include a phenyl group, a substituted phenyl group, and others. Further, examples of the substituent in the substituted phenyl group include an alkyl group, a vinyl group, a mercapto group, an amino group, a nitro group, and a cyano group. Further, when "b" is an integer of 2 or more in the formula (3), two or more $R_6$s may, respectively, be identical or different and two or more $R_7$s may, respectively, be identical or different similarly. Still further, when "a" is an integer of 2 or more in the formula (3), two or more $R_5$s may, respectively, be identical or different and two or more $R_5$s may, respectively, be identical or different similarly.

In addition, from the standpoint of obtaining more excellent flexibility, there are respectively, independently mentioned an alkyl group having a carbon atom of from 1 to 6, a phenyl group, and the like as $R_5$, $R_7$, $R_7$, and $R_8$ in the formula (2) and formula (3) [providing that $R_5$ and $R_8$ are only in the formula (3)]; and said alkyl groups include a methyl group and the like. Moreover, "a" and "c" in the formula (3) can be each independently from 6 to 2,000 and may further be from 10 to 1,000. Also, "b" in the formula (2) and formula (3) can be from 2 to 30 and may further be from 5 to 20.

(Third Form)

The aerogel of the present embodiment may be one obtainable by drying a wet gel, the wet gel being formed from a sol comprising at least one member selected from the group consisting of a polysiloxane compound having a reactive group within a molecule thereof and a hydrolyzed product of said polysiloxane compound. Further, the aerogels that have been mentioned so far may be those obtainable by drying wet gels, the wet gels being formed from sols comprising at least one member selected from the group consisting of a polysiloxane compound having a reactive group within a molecule thereof and a hydrolyzed product of said polysiloxane compound.

The reactive group in the polysiloxane compound having a reactive group is not particularly limited, but its examples include an alkoxy group, a silanol group, a hydroxyalkyl group, an epoxy group, a polyether group, a mercapto group, a carboxyl group, and a phenol group. The polysiloxane compound having these reactive groups may be used singly or in combination of two or more kinds. Among these, the alkoxy group, silanol group, hydroxyalkyl group or the polyether group can improve the flexibility of the aerogel, and furthermore, the alkoxy group or the hydroxyalkyl group can improve the compatibility of sols. Also, from the standpoint of improving the reactivity of the polysiloxane compound as well as of decreasing the thermal conductivity of the aerogel, the respective carbon numbers of the alkoxy group and the hydroxyalkyl group can be from 1 to 6; they can further be from 2 to 4 from the standpoint of more improving the flexibility of the aerogel.

As the polysiloxane compound having a hydroxyalkyl group within a molecule thereof, there is mentioned one having a structure represented by general formula (4) described below. By using the polysiloxane compound having the general formula (4), the structure represented by the general formula (1) described previously can be introduced into the skeleton of an aerogel.

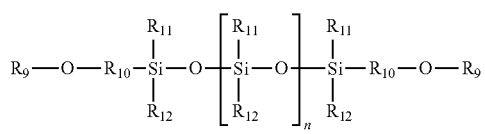

(4)

In the formula (4), $R_9$ represents a hydroxyalkyl group; $R_{10}$ represents an alkylene group; $R_{11}$ and $R_{12}$ each independently represents an alkyl group or an aryl group; and "n" represents an integer of from 1 to 50. Here, the aryl groups include a phenyl group, a substituted phenyl group, and others. Further, examples of the substituent in the substituted phenyl group include an alkyl group, a vinyl group, a mercapto group, an amino group, a nitro group, and a cyano group. Further, in the formula (4), two or more $R_9$s may, respectively, be identical or different and two or more $R_{10}$s may, respectively, be identical or different similarly. Still further, in the formula (4), two or more $R_{11}$s may, respectively, be identical or different and two or more $R_{12}$s may, respectively, be identical or different similarly.

By using the wet gel formed from a sol containing the polysiloxane compound having the above-described structure, it will be easier to obtain an aerogel with low thermal conductivity and flexibility. From such standpoint, in the formula (4) there is mentioned a hydroxyalkyl group having a carbon number of from 1 to 6 or the like as $R_9$, and as said hydroxyalkyl group, there are mentioned a hydroxyethyl group, a hydroxypropyl group, and the like. Also, in the formula (4) there is mentioned an alkylene group having a carbon number of from 1 to 6 or the like as $R_{10}$, and as said alkylene group, there are mentioned an ethylene group, a propylene group, and the like. Further, in the formula (4) as $R_{11}$ and $R_{12}$, there are respectively mentioned an alkyl group having a carbon number of from 1 to 6, a phenyl group, and the like, and as said alkyl group, there is mentioned a methyl group or the like. In addition, "n" in the formula (4) can be from 2 to 30 and may further be from 5 to 20.

Commercial products can be used as the polysiloxane compound having the structure represented by the general formula (4), which include compounds such as X-22-160AS, KF-6001, KF-6002, KF-6003 (all manufactured by Shin-Etsu Chemical Co., Ltd.), XF42-B0970, and Fluid OFOH 702-4% (all manufactured by Momentive Performance Materials Inc.).

As the polysiloxane compound having an alkoxy group within a molecule thereof, there is mentioned one having general formula (5) described below. By using the polysiloxane compound having the structure represented by the general formula (5), the ladder type structure having the bride represented by the general formula (2) described previously can be introduced into the skeleton of an aerogel.

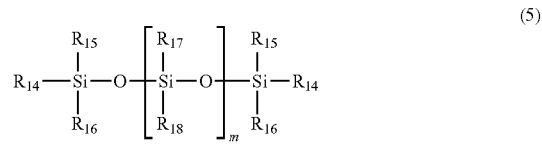

(5)

In the formula (5), $R_{10}$ represents an alkyl group or an alkoxy group; $R_{15}$ and $R_{16}$ each independently represents an alkoxy group; $R^{17}$ and $R^{18}$ each independently represents an alkyl group or an aryl group; and "in" represents an integer of from 1 to 50. Here, the aryl groups include a phenyl group, a substituted phenyl group, and others. Further, examples of the substituent in the substituted phenyl group include, an alkyl group, a vinyl group, a mercapto group, an amino group, a nitro group, and a cyano group. Further, in the formula (5), two or more $R_{14}$s may, respectively, be identical or different and two or more $R_{16}$s may, respectively, be identical or different similarly. Still further, in the formula (5), when in is an integer of 2 or more, two or more $R_{17}$s may, respectively, be identical or different and two or more $R_{18}$s may, respectively, be identical or different similarly.

By using the wet gel formed from a sol containing the polysiloxane compound having the above-described structure, it will be easier to obtain an aerogel with low thermal conductivity and flexibility. From such standpoint, in the formula (5) there are mentioned an alkyl group having a carbon number of from 1 to 6, an alkoxy group having a carbon number of from 1 to 6, and the like as $R_{14}$, and as said alkyl group or said alkoxy group, there are mentioned a methyl group, a methoxy group, an ethoxy group, and the like. Also, in the formula (5) as $R_{15}$ and $R_{16}$, there are respectively, independently mentioned an alkoxy group having a carbon number of from 1 to 6 and the like, and as said alkoxy group, there are mentioned a methoxy group, an ethoxy group and the like. Also, in the formula (5) as $R_{17}$ and $R_{18}$, there are respectively mentioned an alkyl group having a carbon number of from 1 to 6, a phenyl group, and the like, and as said alkyl group, there is mentioned a methyl group or the like. In addition, "in" in the formula (5) can be from 2 to 30 and may further be from 5 to 20.

The polysiloxane compound having the structure represented by the general formula (5) can be obtained, for example, by referring to the production processes that are reported in Japanese Unexamined Patent Publication No. 2000-26609, Japanese Unexamined Patent Publication No. 2012-233110, and others, as appropriate.

Note that because an alkoxy group is hydrolyzed, the polysiloxane compound having the alkoxy group within a molecule thereof has the possibility of being present as a hydrolyzed product in a sol and thus, the polysiloxane compound having the alkoxy group within a molecule thereof and its hydrolyzed product may be coexistent. In addition, the alkoxy groups in the molecule may all be hydrolyzed or may be partially hydrolyzed in the polysiloxane compound having the alkoxy group within a molecule thereof.

These polysiloxane compounds having reactive groups within molecules thereof and the hydrolyzed products of said polysiloxane compounds may be used singly or in combination of two or more kinds.

In preparing the aerogel of the present embodiment, the sol containing the above-described polysiloxane compound can further comprises at least one member selected from the group consisting of a silicone compound having a hydrolyzable functional group within a molecule thereof and a hydrolyzed product of said silicone compound. The silicon number within the molecule of the silicone compound can be 1 or 2. The silicone compound having a hydrolyzable functional group is not particularly limited, but its examples include alkyl silicon alkoxides. Among the alkyl silicon alkoxides, those having the number of hydrolyzable functional group being 3 or less can improve water resistance. Examples of such alkyl silicon alkoxides include methyltrimethoxysilane and dimethyldimethoxysilane. There can also be used silicone compounds having the number of the hydrolyzable functional group at molecular terminus thereof being 3 or less, including bistrimethoxysilylmethane, bistrimethoxysilylethane, bistrimethoxysilylhexane, ethyltrimethoxysilane, vinyltrimethoxysilane, and the like. These silicone compounds may be used singly or in combination of two or more kinds.

In addition, the content of the polysiloxane compound and the hydrolyzed product of said polysiloxane compound can be from 5 to 50 parts by mass and may further be from 10 to 30 parts by mass, based on the total of the sol, 100 parts by mass. If it is set at 5 parts by mass or more, it will be easier to further obtain preferred reactivity; also, if it is set at 50 parts by mass or less, it will be easier to further obtain preferred compatibility.

Moreover, when the sol further contains the above-described silicone compound, the ratio of the content of the polysiloxane compound and the hydrolyzed product of said polysiloxane compound to the content of the silicone compound and the hydrolyzed product of said silicone compound can be from 1:0.5 to 1:4 and may further be from 1:1 to 1:2. If the ratio between the contents of these compounds is set at 1:0.5 or more, it will be easier to further obtain the preferred compatibility; also, if it is set at 1:4 or less, it will be easier to further suppress the shrinkage of the gel.

The sum of the content of the polysiloxane compound and the hydrolyzed product of said polysiloxane compound and the content of the silicone compound and the hydrolyzed product of said silicone compound can be from 5 to 50 parts by mass and may further be from 10 to 30 parts by mass, based on the total amount of the sol, 100 parts by mass. If it is set at 5 parts by mass or more, it will be easier to further obtain the preferred reactivity; also, if it is also set at 50 parts by mass or less, it will be easier to further obtain the preferred compatibility. In so doing, the ratio of the content of the polysiloxane compound and the hydrolyzed product of said polysiloxane compound to the content of the silicone compound and the hydrolyzed product of said silicone compound can be set within the above-described range.

Production Process for Aerogel>

The process for producing the aerogel will next be described. The process for producing the aerogel is not particularly limited; however, it can be produced according to the process described below, for example.

Specifically, the aerogel of the present embodiment can be produced by a production process principally comprising: a step of forming a sol; a step of forming a wet gel, the step comprising gelling the sol obtained in the sol forming step and subsequently maturing it to obtain the wet gel; a step of washing and solvent-substituting the wet gel obtained in the wet gel forming step; and a step of drying comprising drying the wet gel that has been washed and solvent-substituted. Note that the sol is a state prior to causing the gelling reaction and it means, according to the present embodiment, a state where the polysiloxane compound and/or the hydrolyzed product of said polysiloxane compound, and optionally, the silicone compound and/or the hydrolyzed product of said silicone compound are dissolved or dispersed in a solvent. Moreover, the wet gel means a gel solid in a wet state having no fluidity while containing a liquid medium.

Each step of the process for producing the aerogel of the present embodiment will be described hereinbelow.

(Step of Forming Sol)

The step of forming a sol is a step where the polysiloxane compound and/or the silicone compound is mixed with the solvent and hydrolysis is allowed to form the sol. To accelerate the hydrolysis reaction, an acid catalyst can further be added to the solvent in the present step. In addition, as is illustrated in U.S. Pat. No. 5,250,900, a surfactant and a thermally hydrolyzable compound, and the like can also be added to the solvent.

As the solvent, there can be used water or a mixed solution of water and an alcohol, for example. The alcohols include methanol, ethanol, n-propanol, 2-propanol, n-butanol, 2-butanol, t-butanol, and the like. Among these, methanol, ethanol, 2-propanol, and the like are mentioned as an alcohol which likely decreases the interface tension against the gel wall and which has low surface tension and a low boiling point. These may be used singly or in a mixture of two or more kinds.

For example, when an alcohol is used as the solvent, the amount of the alcohol can be 4 to 8 moles, may further be 4 to 6.5 moles, and may still further be 4.5 to 6 moles, based on the total (one mole) of the polysiloxane compound and the silicone compound. If the amount of the alcohol is set at 4 moles or more, it will be easier to obtain more preferred compatibility; also, if it is set at 8 moles or less, it will be easier to suppress the shrinkage of the gel.

The acid catalysts include: inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acid phosphates such as acid aluminum phosphate, acid magnesium phosphate, and acid zinc phosphate; and organic carboxylic acids such as acetic acid, formic acid, propionic acid, oxalic acid, malonic acid, succinic acid, citric acid, malic acid, adipic acid, and azelaic acid. Among these, the organic carboxylic acids are mentioned as the acid catalyst that improves the water resistance of the obtained aerogel more. As said organic carboxylic acid, acetic acid may be mentioned but it may be formic acid, propionic acid, oxalic acid, malonic acid, or the like. These may be used singly or in combination of two or more kinds.

Use of the acid catalyst accelerates hydrolysis of the polysiloxane compound and the silicone compound and, thus, allows the sol to be obtained in a shorter time.

The added amount of the acid catalyst can be from 0.001 to 0.1 parts by mass relative to the total amount, 100 parts by mass, of the polysiloxane compound and the silicone compound.

Non-ionic surfactants, ionic surfactants, and the like can be used as surfactants. These may be used singly or in combination of two or more kinds.

As the non-ionic surfactant, there can be used, for example, ones containing a hydrophilic portion such as polyoxyethylene and a hydrophobic portion principally consisting of an alkyl group and ones containing a hydrophilic portion such as polyoxypropylene. As the one containing a hydrophilic portion such as polyoxyethylene and a hydrophobic portion principally consisting of an alkyl group, there are mentioned polyoxyethylenenonyl phenyl ether, polyoxyethyleneoctyl phenyl ether, polyoxyethylene alkyl ether, and the like. As the one containing a hydrophilic portion such as polyoxypropylene, there are mentioned polyoxypropylenealkyl ether and a block copolymer of polyoxyethylene with polyoxypropylene.

The ionic surfactants include a cationic surfactant, an anionic surfactant, an amphoteric surfactant, and the like. The cationic surfactants include bromocetyltrimethyl ammonium, chlorocetyltrimethyl ammonium, and the like; and the anionic surfactants include sodium dodecyl sulfonate, and the like. Also, the amphoteric surfactants include an amino acid type surfactant, a betaine type surfactant, an amine oxide type surfactant, and the like. Examples of the amino acid type surfactant include acylglutamic acid. Examples of the betaine type surfactant include lauryldimethylaminoacetic acid betaine and stearyldimethylaminoacetic acid betaine. Examples of the amine oxide type surfactant include lauryldimethylamine oxide.

These surfactants bring a small differential chemical affinity between the solvent in the reaction system and the growing siloxane polymer and function to suppress phase separation in the step of forming a wet gel which will be described later.

The added amount of the surfactant depends on the type of the surfactant or the types of the polysiloxane compound and the silicone compound as well as on their amounts; however, it can be, for example, from 1 to 100 parts by mass and may further be from 5 to 60 parts by mass, based on the total amount, 100 parts by mass, of the polysiloxane compound and the silicone compound The thermally hydrolyzable compound generates a base catalyst through thermal hydrolysis, causes the reaction solution to be basic, and accelerates a sol/gel reaction in the step of forming a wet gel which will be described later. Hence, this thermally hydrolyzable compound is not particularly limited as long as it is a compound capable of causing the reaction solution to be basic after the hydrolysis. There are mentioned urea; acid amides such as formamide, N-methylformamide, N,N-dimethylformamide, acetoamide, N-methylacetoamide, and N, N-dimethylacetoamide; and cyclic nitrogen compounds such as hexamethylenetetramine. Among these, urea likely allows the above-described acceleration effect to be obtained particularly.

The added amount of the thermally hydrolyzable compound is not particularly limited as long as it is a amount capable of sufficiently accelerating a sol/gel reaction in the step of forming a wet gel which will be descried later. For example, when urea is used as the thermally hydrolyzable compound, the amount of its addition can be from 1 to 200 parts by mass and may further be from 1 to 50 parts by mass, based on the total amount, 100 parts by mass, of the polysiloxane compound and the silicone compound. If the added amount is set at 1 mass part or more, it will be easier to obtain preferred reactivity; also, if the added amount is set at 200 parts by mass or less, it will be easier to suppress the precipitation of crystals as well as suppress a decrease in the gel density.

The hydrolysis in the step of forming a sol depends on the types and amounts of the polysiloxane compound, the silicone compound, the acid catalyst, the surfactant, and the like in the mixed solution; however, it may, for example, be conducted for 10 minutes to 24 hours under a temperature condition of from 20 to 60° C. and for 5 minutes to 8 hours under a temperature condition of from 50 to 60° C. Thereby, the hydrolyzable functional groups in the polysiloxane compound and the silicone compound are sufficiently hydrolyzed, and there can be more securely obtained the hydrolyzed product of the polysiloxane compound and the hydrolyzed product of the silicone compound.

Notwithstanding, when the thermally hydrolyzable compound is added to the solvent, the temperature condition in the step of forming a sol may be adjusted to a temperature that suppresses the hydrolysis of the thermally hydrolyzable compound as well as suppresses the gelation of the sol. The temperature in this instance may be any temperature as long as it is a temperature capable of suppressing the hydrolysis of the thermally hydrolyzable compound. For example, when urea is used as the thermally hydrolyzable compound, the temperature condition in the step of forming a sol can be from 0 to 40° C. and may further be from 10 to 30° C.

(Step of Forming Wet Gel)

The step of forming a wet gel is a step which gelatinizes the sol obtained in the step of forming a sol and subsequently matures it to produce the wet gel. A base catalyst can be used in the present step to accelerate the gelation.

The base catalysts include: alkaline metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic sodium phosphate salts such as sodium metaphosphate, sodium pyrophosphate, and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and a derivative thereof, piperizine and a derivative thereof, and imidazole and a derivative thereof. Among these, ammonium hydroxide (ammonia water) is excellent from the standpoint that because its volatility is high and it hardly remains in the aerogel after drying, it does not impair water resistance as well as more from the standpoint of economic efficiency. The base catalysts may be used singly or in combination of two or more kinds.

By using the base catalyst, it will be possible to accelerate a dehydration/condensation reaction and dealcoholization/condensation reaction of the polysiloxane compound and/or the hydrolyzed product of the polysiloxane compound as well as the silicone compound and/or the hydrolyzed product of the silicone compound in the sol and to carry out the gelation of the sol in a shorter time. This also allows a wet gel having a higher strength (rigidity) to be obtained. Especially, ammonia has high volatility and hardly remains in the aerogel; therefore, if ammonia is used as the base catalyst, it will be possible to obtain an aerogel having more excellent water resistance.

The added amount of the base catalyst can be from 0.5 to 5 parts by mass and may further be from 1 to 4 parts by mass, based on the total amount, 100 parts by mass, of the polysiloxane compound and the silicone compound. If the added amount is set at 0.5 parts by mass or more, it will be possible to carry out the gelation in a shorter time; if the added amount is set at 5 parts by mass or less, it will be possible to suppress a decrease in water resistance more.

The gelation of the sol in the step of forming a wet gel may be conducted in a sealed container so that the solvent and the base catalyst may not evaporate. The temperature of gelation can be from 30 to 90° C. and may further be from 40 to 80° C. If the temperature of gelation is set at 30° C. or higher, the gelation can be conducted in a shorter time and a wet gel having higher strength (rigidity) can be obtained. Further, if the temperature of gelation is set at 90° C. or lower, it will allow the evaporation of the solvent (especially, alcohols) to be easily suppressed, and thus, the gelation can be caused while the volume shrinkage is suppressed.

Maturation in the step of forming a wet gel may be conducted in a sealed container so that the solvent and the base catalyst may not evaporate. Because of the maturation, bonding of the components constituting the wet gel will be strong; and consequently, it will be possible to obtain a wet gel having high strength (rigidity) that is sufficient to suppress the shrinkage during drying. The temperature of maturation can be 30 to 90° C. and may further be 40 to 80° C. If the temperature of maturation is set at 30° C. or higher, it will be possible to obtain a wet gel having higher strength (rigidity). Also, if the temperature of maturation is set at 90° C. or lower, it will allow the evaporation of the solvent (especially, alcohols) to be easily suppressed, and thus, the gelation can be caused while the volume shrinkage is suppressed.

Further, because there are cases where it is difficult to judge the point at which the gelation of the sol is complete, the gelation of the sol and the subsequent maturation may be conducted continuously in a series of manipulations.

The time of gelation and the time of maturation differ depending on the temperature of gelation and the temperature of maturation; however, when the time of gelation and the time of maturation are totaled, it can be 4 to 480 hours and may further be 6 to 120 hours. If the total of the time of gelation and the time of maturation is set at 4 hours or more, it will be possible to obtain a wet gel having higher strength (rigidity); if it is set at 480 hours or less, it will be easier to maintain the effects of the maturation.

In order that the density of the aerogel to be obtained should be lowered and the average pore diameter of the aerogel to be obtained should be made large, the temperature of gelation and the temperature of maturation can be heightened within the above-described range and the total of the time of gelation and the time of maturation can be lengthened within the above-described range. Additionally, in order that the density of the aerogel to be obtained should be heightened and the average pore diameter of the aerogel to be obtained should be made small, the temperature of gelation and the temperature of maturation can be lowered within the above-described range and the total of the time of gelation and the time of maturation can be shortened within the above-described range.

(Step of Washing and Solvent-Substituting)

The step of washing and solvent-substituting is a step having a step of washing (washing step) a wet gel obtained in the step of forming a wet gel as described above and a step of substituting (solvent-substituting step) a washing liquid in the wet gel with a solvent that is suitable for drying conditions (drying step to be described later). The step of washing and solvent-substituting is feasible even in the form of only carrying out the step of solvent-substituting without carrying out the step of washing a wet gel; however, the wet gel may be washed from the standpoint of reducing impurities such as unreacted products and by-products in the wet gel and enabling the production of an aerogel with higher purity.

The washing step washes the wet gel obtained in the step of forming a wet gel. Said washing can be, for example, carried out repeatedly using water or an organic solvent. In so doing, heating can improve washing efficiency.

As the organic solvent, there can be used a variety of organic solvents, including methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylenechloride, N,N-dimethylformamide, dimethyl sulfoxide, acetic acid, formic acid, and the like. The organic solvents may be used singly or in a mixture of two or more kinds.

In order to suppress the shrinkage of the gel through drying, a solvent with low surface tension can be used in the step of solvent-substituting which will be described later. However, the solvent with low surface tension generally has extremely low mutual solubility with water. Therefore, if the solvent with low surface tension is used in the step of solvent-substituting, the organic solvents to be used in the step include hydrophilic organic solvents having high mutual solubilities toward both of water and the solvent with low surface tension. Further, the hydrophilic organic solvent for use in the step of washing can play a role of preliminary substitution for the sake of the step of solvent-substituting. Among the organic solvents, the hydrophilic organic solvents include methanol, ethanol, 2-propanol, acetone, methyl ethyl ketone, and the like. In addition, methanol, ethanol, methyl ethyl ketone, and the like are excellent from the standpoint of economic efficiency.

The amount of water or the organic solvent to be used in the step of washing can be an amount capable of substituting and washing the solvent in the wet gel sufficiently. Said amount can be from 3 to 10 times the volume of the wet gel. Washing can be repeated until the water content in the wet gel after the washing reaches 10% by mass or less relative to the mass of silica.

The temperature environment in the step of washing can be a temperature below the boiling point of the solvent to be used in the washing. For example, when methanol is used, heating is set at the level of from 30 to 60° C.

In the step of solvent-substituting, the solvent in the washed wet gel is substituted with a prescribed solvent for substitution to suppress the shrinkage in the step of drying which will be described later. In so doing, heating can improve the efficiency of substitution. The solvents with low surface tension to be described later are specifically mentioned as the solvent for substitution when drying in the step of drying is conducted at a temperature of less than the critical point of the solvent to be used for drying under atmospheric pressure. On the other hand, when supercritical drying is conducted, examples of the solvent for substitution include ethanol, methanol, 2-propanol, dichlorodifluoroethane, carbon dioxide, and a mixed solvent of two or more of the foregoing.

As the solvent with low surface tension, there are mentioned those having a surface tension of 30 mN/m or less at 20° C. Further, said surface tension may be 25 mN/m or less and may even be 20 mN/m or less. Examples of the solvent with low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6). In the parentheses, the surface tensions at 25° C. are shown and their units are mN/m. Among these, the aliphatic hydrocarbons (e.g., hexane and heptane) have low surface tension as well as excellent work environment adaptability. Also, if the hydrophilic organic solvents such as acetone, methyl ethyl ketone, 1,2-dimethoxyethane, and the like are used out of these, they can serve as the organic solvent in the step of washing step as well. Further, ones which have boiling points of 100° C. or less under normal pressure may be used out of these from the standpoint that drying in the step of drying as described later is easy. The organic solvents may be used singly or in a mixture of two or more kinds.

The amount of the solvent to be used in the step of solvent-substituting can be an amount capable of sufficiently substituting the solvent in the wet gel after drying. Said amount can be from 3 to 10 times the volume of the wet gel.

The temperature environment in the step of solvent-substituting can be a temperature below the boiling point of the solvent to be used in the substitution. For example, when heptane is used, heating is set at the level of from 30 to 60° C.

(Drying Step)

The step of drying dries a wet gel that has been washed and solvent-substituted as described later. This allows the aerogel to be finally obtained.

The technique of drying is not particularly limited, and there can be used normal pressure drying, supercritical drying or freeze-drying, each of which is known in the art. Among these, the normal pressure drying or the supercritical drying can be used from the standpoint that an aerogel with low density is easily produced. Also, from the standpoint of enabling production at low costs, the normal pressure drying can be used. Note that the normal pressure in the present embodiments means 0.1 MPa (atmospheric pressure).

The aerogel of the present embodiment can be obtained by drying the wet gel that has been washed and solvent-substituted at a temperature of less than the critical temperature of the solvent to be used in drying under atmospheric pressure. The temperature of drying differs depending on the type of the solvent substituted but can be from 20 to 80° C. in consideration of the point that there are cases where drying at high temperatures especially accelerates the rate of evaporation of the solvent to generate large cracks in the gel. Moreover, said temperature of drying may further be from 30 to 60° C. In addition, the time of drying differs depending on the volume of the wet gel and the temperature of drying but can be from 4 to 120 hours. Note that according to the present embodiments, the normal pressure drying encompasses speeding up drying by application of pressure in the range within which productivity is not obstructed.

The aerogel of the present embodiment can also be obtained by super critically drying the wet gel that has been washed and solvent-substituted. The supercritical drying can be conducted with the techniques that are known in the art. As the method of supercritical drying, there is, for example, mentioned a method by which the solvent is removed at a temperature of not less than the critical temperature of the solvent contained in the wet gel. Alternatively, as the method of supercritical drying, there is mentioned a method comprising: immersing the wet gel in liquidated carbon dioxide under the conditions, for example, on the orders of from 20 to 25° C. and from 5 to 20 MPa; thereby substituting the whole or part of the solvent contained in the wet gel with carbon dioxide with its critical point being lower that of said solvent; and then removing the carbon dioxide itself or a mixture of the carbon dioxide and the solvent.

The aerogel obtained by the normal pressure drying or the supercritical drying thus mentioned may further be additionally dried at from 105 to 200° C. for about 0.5 to 2 hours under normal pressure. This allows an aerogel having low density and small pores to be more easily obtained. The additional drying can be carried out at from 1 to 50 to 200° C. under normal pressure.

The aerogels of the present embodiments that are obtained through the steps thus far mentioned have thermal conductivities of 0.03 W/m·K or less and compressive elasticity moduli of 2 MPa or less at 25° C. under atmospheric pressure, as well as possess excellent thermal insulation and productivities that are unattainable by the aerogels in the prior art. Considering these advantages, the application can be in the usages as thermal insulating materials in the construction field, automobile field, consumer electronics, semiconductor field, industrial facilities, and others. The aerogels of the present embodiments can be utilized as additives for paints, cosmetics, anti-blocking agents, catalyst supports, and others in addition to the usage as thermal insulating materials.

EXAMPLES

The present invention will be next described by way of the examples below in more detail; however, these examples are not intended to limit the present invention.

Preparation of Aerogels

Example 1

Forty (40.0) parts by mass of carbinol-modified siloxane represented by the general formula (4) "X-22-160AS" (product name: manufactured by Shin-Etsu Chemical Co., Ltd.) as a polysiloxane compound, 60.0 parts by mass of methyltrimethoxysilane "LS-530" (product name; abbreviated as "MTMS" hereafter: manufactured by Shin-Etsu Chemical Co., Ltd.) as a silicone compound, 120.0 parts by mass of water, and 80.0 parts by mass of methanol were mixed. To this was added 0.10 parts by mass of acetic acid as an acid catalyst, and reaction was allowed at 25° C. for 8 hours to obtain a sol. To the obtained sol was added 40.0 parts by mass of ammonia water with a concentration of 5%. After gelation at 60° C. for 8 hours, it was matured at 80° C. for 48 hours to obtain a wet gel. The obtained wet gel was then immersed in 2500.0 parts by mass of methanol, and washing was carried out at 60° C. over 12 hours. This washing manipulation was carried out three times while the methanol was exchanged for fresh methanol. The washed wet gel was next immersed in 2500.0 parts by mass of heptane as a low surface tension solvent, and solvent substitution was carried out at 60° C. over 12 hours. This manipulation of solvent substitution was carried out three times while the heptane was exchanged for fresh heptane. The wet gel that had been washed and solvent-substituted was dried at 40° C. for 96 hours under normal pressure; thereafter, it was further dried at 150° C. for 2 hours to obtain Aerogel 1 having the structure represented by the general formula (1).

Example 2

Forty (40.0) parts by mass of X-22-16 represented by the general formula (4) as a polysiloxane compound, 60.0 parts by mass of MTMS as a silicone compound, 120.0 parts by mass of water, and 80.0 parts by mass of methanol were mixed. To this were added 0.10 parts by mass of acetic acid as an acid catalyst, and 20.0 parts by mass of cetyltrimethylammonium bromide (manufactured by Wako Pure Chemical Industries, Ltd.: abbreviated as "CTAB" hereafter) as a cationic surfactant; and reaction was allowed at 25° C. for 8 hours to obtain a sol. Thereafter, Aerogel 2 having the structure represented by the general formula (1) was obtained in a similar manner to Example 1.

Example 3

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 40.0 parts by mass of X-22-160AS represented by the general formula (4) as a polysiloxane compound and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 3 having the structure represented by the general formula (1) was obtained in a similar manner to Example 1.

Example 4

Two hundred (200.0) parts by mass of water, 0.10 parts by mass of acetic acid as an acid catalyst, 20.0 parts by mass of "F-127," which is a block copolymer of polyoxyethylene and polyoxypropylene (product name: manufactured by BASF), as a non-ionic surfactant, and 120.0 parts by mass of urea as a thermally hydrolyzable compound were mixed. To this were added 40.0 parts by mass of X-22-160AS represented by the general formula (4) as a polysiloxane compound, and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 4 having the structure represented by the general formula (1) was obtained in a similar manner to Example 1.

Example 5

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of X-22-160AS represented by the general formula (4) as a polysiloxane compound and 80.0 parts by mass of MTMS as a silicone compound; and reaction was allowed at 25° C. for 2 hours to obtain a sol. After gelation at 60° C. for 8 hours, the obtained gel was matured at 80° C. for 48 hours to obtain a wet gel. Thereafter, Aerogel 5 having the structure represented by the general formula (1) was obtained in a similar manner to Example 1.

Example 6

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 40.0 parts by mass of a polysiloxane compound having both termini modified with two alkoxy functionalities represented by the general formula (5) (hereafter referred to as "polysiloxane compound A) as a polysiloxane compound and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 6 having a ladder type structure which comprises the structures represented by the general formulas (2) and (3) was obtained in a similar manner to Example 1.

Note that the "polysiloxane compound A" was synthesized in the following manner. In a 1-liter flask having three necks that was provided with a stirrer, a thermometer and a Dimroth condenser, 100.0 parts by mass of hydroxy-terminated dimethylpolysiloxane "XC96-723" (product name: Momentive Performance Materials Inc.), 181.3 parts by mass of methyltrimethoxysilane, and 0.50 parts by mass of t-butylamine were mixed; and reaction was allowed at 30° C. for 5 hours. This reaction solution was then heated at 140° C. for 2 hours under a reduced pressure of 1.3 kPa to remove volatile portions, whereby the polysiloxane compound having both termini modified with two alkoxy functionalities (polysiloxane compound A) was obtained.

Example 7

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of the polysiloxane compound A represented by the general formula (5) as a polysiloxane compound and 80.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 7 having ladder type structures represented by the general formulas (2) and (3) was obtained in a similar manner to Example 1.

Example 8

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of X-22-160AS represented by the general formula (4) as a polysiloxane compound and 60.0 parts by mass of MTMS, and 20.0 parts by mass of bistrimethoxysilylhexane as silicone compounds; and reaction was allowed at 25° C. for 2 hours to obtain a sol. After gelation at 60° C. for 8 hours, the obtained sol was matured at 80° C. for 48 hours to obtain a wet gel. Thereafter, Aerogel 8 having the structure represented by the general formula (1) was obtained in a similar manner to Example 1.

Example 9

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of the polysiloxane compound A represented by the general formula (5) as a polysiloxane compound, 60.0 parts by mass of MTMS, and 20.0 parts by mass of bistrimethoxysilylhexane as silicone compounds; and reaction was allowed at 25° C. for 2 hours to obtain a sol. After gelation at 60° C. for 8 hours, the obtained sol was matured at 80° C. for 48 hours to obtain a wet gel. Thereafter, Aerogel 9 having ladder type structures represented by the general formulas (2) and (3) was obtained in a similar manner to Example 1.

Example 10

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of X-22-160AS represented by the general formula (4) and 20.0 parts by mass of the polysiloxane compound A represented by the general formula (5) as polysiloxane compounds, and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 10 having the structure represented by the general formula (1) as well as the ladder type structures represented by the general formulas (2) and (3) was obtained in a similar manner to Example 1.

Example 11

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 40.0 parts by mass of X-22-160AS represented by the general formula (4) as a polysiloxane compound and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. The obtained wet gel was then immersed in 2500.0 parts by mass of methanol, and washing was carried out at 60° C. over 12 hours. This washing manipulation was carried out three times while the methanol was exchanged for fresh methanol. The washed wet gel was next immersed in 2500.0 parts by mass of 2-propanol, and solvent substitution was carried out at 60° C. over 12 hours. This manipulation of solvent substitution was carried out three times while the 2-propanol was exchanged for fresh 2-propanol.

Next, super critical drying of the solvent-substituted wet gel was carried out. An autoclave was filled with 2-propanol, and the solvent-substituted wet gel was charged therein. Further, liquefied carbon dioxide was fed in the autoclave to fill the inside of the autoclave with a mixture of 2-propanol and carbon dioxide as a dispersion medium. Heat and pressure were then applied to the autoclave so that its interior environment were 80° C. and 14 MPa, and after sufficiently circulating supercritical carbon dioxide within the autoclave, the pressure was reduced to remove 2-propanol and carbon dioxide contained in the gel. Thus, Aerogel 11 having the structure represented by the general formula (1) was obtained.

Example 12

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 40.0 parts by mass of the polysiloxane compound A represented by the general formula (5) as a polysiloxane compound and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 12 having ladder type structures represented by the general formulas (2) and (3) was obtained in a similar manner to Example 11.

Example 13

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 40.0 parts by mass of a polysiloxane compound having both termini modified with three alkoxy functionalities represented by the general formula (5) (hereafter referred to as "polysiloxane compound B) as a polysiloxane compound and 60.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 13 was obtained in a similar manner to Example 1.

Note that the "polysiloxane compound B" was synthesized in the following manner. First, in a 1-liter flask having three necks that was provided with a stirrer, a thermometer and a Dimroth condenser, 100.0 parts by mass of XC96-723, 202.6 parts by mass of tetramethoxysilane, and 0.50 parts by mass of t-butylamine were mixed; and reaction was allowed at 30° C. for 5 hours. This reaction solution was then heated at 140° C. for 2 hours under a reduced pressure of 1.3 kPa to remove volatile portions, whereby the polysiloxane compound having both termini modified with three alkoxy functionalities (polysiloxane compound B) was obtained.

Example 14

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 20.0 parts by mass of the polysiloxane compound B represented by the general formula (5) as a polysiloxane compound and 80.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 14 was obtained in a similar manner to Example 1.

Comparative Example 1

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this was added 100.0 parts by mass of MTMS as a silicone; and reaction was allowed at 25° C. for 2 hours to obtain a sol. After gelation at 60° C. for 8 hours, the obtained sol was matured at 80° C. for 48 hours to obtain a wet gel. Thereafter, Aerogel 15 was obtained in a similar manner to Example 1.

Comparative Example 2

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 70.0 parts by mass of MTMS and 30.0 parts by mass of dimethyldimethoxysilane "LS-520" (product name; abbreviated as "DMDMS" hereafter: manufactured by Shin-Etsu Chemical Co., Ltd.) as silicone compounds; and reaction was allowed at 25° C. for 2 hours to obtain a sol. After the gelation at 60° C. for 8 hours, the obtained sol was matured at 80° C. for 48 hours to obtain a wet gel. Thereafter, Aerogel 16 was obtained in a similar manner to Example 1.

Comparative Example 3

Two hundred (200.0) parts by mass of water, 0.10 parts by mass of acetic acid as an acid catalyst, 20.0 parts by mass of CTAB as a cationic surfactant, and 120.0 parts by mass of urea as a thermally hydrolyzable compound were mixed. To this were added 60.0 parts by mass of MTMS and 40.0 parts by mass of DMDMS as silicone compounds; and reaction was allowed at 25° C. for 2 hours to obtain a sol. After gelation at 60° C. for 8 hours, the obtained sol was matured at 80° C. for 48 hours to obtain a wet gel. Thereafter, Aerogel 17 was obtained in a similar manner to Example 1.

Comparative Example 4

Two hundred (200.0) parts by mass of water, 0.10 parts by mass of acetic acid as an acid catalyst, 20.0 parts by mass of CTAB as a cationic surfactant, 120.0 parts by mass of urea as a thermally hydrolyzable compound were mixed. To this was added 100.0 parts by mass of MTMS as a silicone compound; and reaction was allowed at 25° C. for 2 hours to obtain a sol. After gelation at 60° C. for 8 hours, the obtained sol was matured at 80° C. for 48 hours to obtain a wet gel. Thereafter, Aerogel 18 was obtained in a similar manner to Example 1.

Drying methods and Si starting materials (polysiloxane compounds and silicone compounds) in the respective Examples and Comparative Examples are altogether shown in Table 1.

[Various Evaluations]

As for Aerogels 1-18 obtained in the respective Examples and Comparative Examples, the thermal conductivities, compressive elasticity moduli, maximum compressive deformation rates, recovery rates from deformation, signal area ratios of silicon-containing bonding units Q, T, and D, densities, and porosities were measured under the conditions described below and were evaluated. The results of evaluations are altogether shown in Table 2.

(1) Measurement of Thermal Conductivity

By using a blade with an edge angle of from about 20 to about 25 degrees, the aerogel was processed into a size of from 150×150×100 mm$^3$ to make a sample for measurement. If necessary, the sample for measurement was next shaped with sandpaper of #1500 and above to secure the parallelism of surfaces. Prior to the measurement of thermal conductivity, the constant temperature drying oven "DVS402" (product name: manufactured by Yamato Scientific Co. Ltd.) was used to dry the obtained sample for measurement at 100° C. for 30 minutes under atmospheric pressure. The sample for measurement was next transferred into a desiccator and was cooled to 25° C.

The measurement of thermal conductivity was carried out using the steady state thermal conductivity measuring device "HFM436Lamda" (product name: manufactured by NETZSCH GmbH & Co.). The measurement conditions were at an average temperature of 25° C. and under atmospheric pressure. The sample for measurement obtained as described above was sandwiched between an upper heater and a lower heater at a load of 0.3 MPa to set a temperature differential $\Delta T$ of 20° C. and was adjusted such that one-dimensional heat flow was formed by a guard heater, while the upper surface temperature and the lower surface temperature of the sample for measurement were measured. Thermal resistance $R_S$ of the sample for measurement was then determined according to the following equation:

$$R_S = N((T_U - T_L)/Q) - R_O$$

wherein $T_U$ represents an upper surface temperature of the sample for measurement; $T_L$ represents a lower surface temperature of the sample for measurement; $R_O$ represents a contact thermal resistance of an interface between the upper and lower surfaces; and Q represents an output of a heat flux meter. Note that N was a proportionality coefficient and was determined in advance by using a calibration sample.

Thermal conductivity $\lambda$ of the sample for measurement was determined from the obtained thermal resistance $R_S$ according to the following equation:

$$\lambda = d/R_S$$

wherein "d" represents a thickness of the sample for measurement.

(2) Measurement of Compressive Elasticity Modulus, Maximum Compressive Deformation Rate, and Recovery Rate from Deformation By using a blade with an edge angle of from about 20 to about 25 degrees, the aerogel was processed into a cube of 7.0 mm square (in dice form) to make a sample for measurement. If necessary, the sample for measurement was next shaped with sandpaper of #1500 and above to secure the parallelism of surfaces. Prior to the measurement of thermal conductivity, the constant temperature drying oven "DVS402" (product name: manufactured by Yamato Scientific Co. Ltd.) was used to dry the sample for measurement at 100° C. for 30 minutes under atmospheric pressure. The sample for measurement was next transferred into a desiccator and was cooled to 25° C.

The small size desk top type tester "EZTest" (product name: Shimadzu Corporation) was used as the measuring device. Further, one with 500 N was used as a load cell. Also, an upper platen (φ 20 mm) and a lower platen (φ 118 mm), both of which were made of stainless steel, were used as compression measuring jigs. The sample for measurement was set between the upper platen and the lower platen that were arranged in parallel, and compression was carried out at a rate of 1 mm/min. The temperature for measurement was set at 25° C., and the measurement was caused to end at a point that a load exceeding 500 N was applied or the sample for measurement was destroyed. Here, strain ε was determined according to the following equation:

$$\varepsilon = \Delta d/d1$$

wherein $\Delta d$ represents a deviation (mm) in the thickness of the sample for measurement under load and $d1$ represents a thickness (mm) of the sample for measurement before the load is applied.

Further, compressive stress σ (MPa) was determined according to the following equation:

$$\sigma = F/A$$

wherein F represents compressive force (N) and A represents a cross section area (mm²) of the sample for measurement before the load is applied.

The compressive elasticity modulus E (MPa) was determined in the range of the compressive force being from 0.1 to 0.2 N according to the following equation:

$$E = (\sigma_2 - \sigma_1)/(\varepsilon_2 - \varepsilon_1)$$

wherein $\sigma_1$ represents compressive force (MPa) measured when the compressive force is 0.1 N; $\sigma_2$ represents compressive force (MPa) measured when the compressive force is 0.2 N; $\varepsilon_1$ represents compressive strain measured when the compressive stress is $\sigma_1$; and $\varepsilon_2$ is compressive strain measured when the compressive stress is $\sigma_2$.

Moreover, the recovery rate from deformation and the maximum compressive deformation rate were calculated according to the equation below, providing that the thickness of a sample for measurement before load is applied is d1, the thickness of a sample for measurement at a point that a maximum load of 500 N is applied or the sample for measurement is destroyed is d2, and the thickness of a sample for measurement after the load has been removed is d3.

Recovery rate from deformation = $(d3-d2)/(d1-d2) \times 100$

Maximum compressive deformation rate = $(d1-d2)/d1 \times 100$ (3) Measurement of Signal Area Ratios Relating to Silicon-Containing Bonding Units Q, T, and D The measurement was carried out using a "FT-NMR AV400WB" (product name: manufactured by Brucker Biospin KK) as a solid $^{29}$Si-NMR device. The measurement conditions were as follows: measuring mode—DD/MAS method; probe—CPMAS probe with 4 mm φ; magnetic field—9.4 T; resonance frequency—79 Hz; number of MAS rotation—6 kHZ; and delayed time—150 seconds. Sodium 3-trimethylsilylpropionate was used as the standard sample.

The aerogel was finely cut to prepare the sample for measurement; and this was packed in a rotor made of $ZrO_2$ and mounted on a probe to carry out the measurement. Also, in the spectrum analysis the Line Broadening coefficient was set at 2 Hz, and the signal area ratios relating to the silicon-containing bonding units Q, T, and D (Q+T:D) were determined.

(4) Measurement of Density and Porosity

With respect to the aerogels, the central diameters, densities, and porosities of holes (or pores) that are continuously communicating in a three-dimensional reticulate fashion were measured by the mercury penetration method in accordance with DIN66133. Note that the temperature for measurement was set at room temperature (25° C.) and an AutoPore IV9520 (product name: manufactured by Shimadzu Corporation) was used as the measuring device.

TABLE 1

| | Drying Method | Si Material Type | Added Amount (weight part) |
|---|---|---|---|
| Example 1 | normal pressure | X-22-160AS | 40.0 |
| | | MTMS | 60.0 |
| Example 2 | normal pressure | X-22-160AS | 40.0 |
| | | MTMS | 60.0 |
| Example 3 | normal pressure | X-22-160AS | 40.0 |
| | | MTMS | 60.0 |
| Example 4 | normal pressure | X-22-160AS | 40.0 |
| | | MTMS | 60.0 |
| Example 5 | normal pressure | X-22-160AS | 20.0 |
| | | MTMS | 80.0 |
| Example 6 | normal pressure | polysiloxane compound A | 40.0 |
| | | MTMS | 60.0 |
| Example 7 | normal pressure | polysiloxane compound A | 20.0 |
| | | MTMS | 80.0 |
| Example 8 | normal pressure | X-22-160AS | 20.0 |
| | | MTMS | 60.0 |
| | | bistrimethoxy-silylhexane | 20.0 |
| Example 9 | normal pressure | polysiloxane compound A | 20.0 |
| | | MTMS | 60.0 |
| | | bistrimethoxy-silylhexane | 20.0 |
| Example 10 | normal pressure | X-22-160AS | 20.0 |
| | | polysiloxane compound A | 20.0 |
| | | MTMS | 60.0 |
| Example 11 | supercritical | X-22-160AS | 40.0 |
| | | MTMS | 60.0 |
| Example 12 | supercritical | polysiloxane compound A | 40.0 |
| | | MTMS | 60.0 |
| Example 13 | normal pressure | polysiloxane compound B | 40.0 |
| | | MTMS | 60.0 |
| Example 14 | normal pressure | polysiloxane compound B | 20.0 |
| | | MTMS | 80.0 |
| Comparative Example 1 | normal pressure | MTMS | 100.0 |
| Comparative Example 2 | normal pressure | MTMS | 70.0 |
| | | DMDMS | 30.0 |
| Comparative Example 3 | normal pressure | MTMS | 60.0 |
| | | DMDMS | 40.0 |
| Comparative Example 4 | supercritical | MTMS | 100.0 |

TABLE 2

| | Thermal Conductivity [W/m·K] | Compressive Elasticity Modulus [Mpa] | Recovery Rate from Deformation [%] | Maximum Compressive Deformation Rate [%] | Q + T:D Area Ratio | Density [g/cm³] | Porosity [%] |
|---|---|---|---|---|---|---|---|
| Example 1 | 0.027 | 0.20 | 94.6 | 87.2 | 1:0.10 | 0.19 | 88.7 |
| Example 2 | 0.024 | 0.42 | 95.0 | 87.1 | 1:0.10 | 0.18 | 88.4 |
| Example 3 | 0.022 | 0.68 | 95.5 | 86.8 | 1:0.10 | 0.17 | 89.0 |
| Example 4 | 0.024 | 0.43 | 95.1 | 87.0 | 1:0.10 | 0.18 | 88.8 |
| Example 5 | 0.017 | 1.42 | 93.7 | 85.2 | 1:0.04 | 0.17 | 90.6 |
| Example 6 | 0.019 | 0.94 | 95.2 | 86.0 | 1:0.09 | 0.17 | 90.5 |
| Example 7 | 0.016 | 1.64 | 93.2 | 84.2 | 1:0.03 | 0.16 | 91.2 |
| Example 8 | 0.019 | 0.98 | 95.1 | 85.9 | 1:0.04 | 0.17 | 90.6 |
| Example 9 | 0.018 | 1.22 | 94.3 | 85.5 | 1:0.04 | 0.16 | 90.8 |
| Example 10 | 0.020 | 0.85 | 96.2 | 86.4 | 1:0.10 | 0.18 | 90.1 |
| Example 11 | 0.022 | 0.70 | 95.6 | 86.6 | 1:0.10 | 0.18 | 89.4 |
| Example 12 | 0.019 | 0.96 | 95.0 | 86.0 | 1:0.10 | 0.17 | 89.8 |
| Example 13 | 0.018 | 0.10 | 94.2 | 85.0 | 1:0.07 | 0.17 | 91.5 |
| Example 14 | 0.015 | 1.84 | 92.2 | 83.2 | 1:0.02 | 0.16 | 92.2 |
| Comparative Example 1 | 0.017 | 7.40 | destroyed | 17.3 | 1:0 | 0.17 | 91.2 |
| Comparative Example 2 | 0.041 | 1.25 | 92.5 | 84.3 | 1:0.54 | 0.18 | 86.8 |
| Comparative Example 3 | 0.045 | 0.15 | 96.2 | 87.6 | 1:0.67 | 0.19 | 86.4 |
| Comparative Example 4 | 0.017 | 7.38 | destroyed | 15.8 | 1:0 | 0.16 | 92.2 |

Further, FIG. 1 is a diagram showing a chart of measurement obtained when the thermal conductivity of the aerogel of Example 10 was measured under atmospheric pressure by using the steady state thermal conductivity measuring device. According to FIG. 1, it is understood that the aerogel of Example 10 has a thermal conductivity of 0.020 W/m·K at 25° C.

Still further, FIG. 2 is a diagram showing a stress-distortion curve of the aerogel of Example 1. According to FIG. 2, the compressive elasticity modulus of the aerogel of Example 1 at 25° C. can be calculated to be 0.20 MPa.

Based on Table 2, it can be grasped that each aerogel of the Examples has a thermal conductivity of 0.03 W/m·K or less, a compressive elasticity modulus of 2 MPa or less, a recovery rate from deformation of 90% or more, and a maximum compressive deformation rate of 80% or more, as well as possesses thermal insulation and flexibility. In addition, the aerogels of the Examples were such that the signal area ratios Q+T:D, which relate silicon-containing bonding units Q, T, and D, were in the range of from 1:0.01 to 1:0.5 in the solid $^{29}$Si-NMR spectra as measured by using the DD/MAS method.

By contrast, although Comparative Examples 1 and 4 had thermal conductivities of 0.03 W/m·K or less, they had such large compressive elasticity moduli as to be week against deformation and were easily destroyed. Further, Comparative Example 2 had a large thermal conductivity. Comparative Example 3 had a large thermal conductivity although it had sufficient flexibility.

INDUSTRIAL APPLICABILITY

The aerogel of the present invention has a thermal conductivity of 0.03 W/m·K or less and a compressive elasticity modulus of 2 MPa or less at 25° C. under atmospheric pressure, as well as possess excellent thermal insulation and flexibility that are unattainable by the aerogels in the prior art. Considering these advantages, the application can be in the usages as thermal insulating materials in the construction field, automobile field, consumer electronics, semiconductor field, industrial facilities, and others. Also, the aerogel of the present invention can be utilized as an additive for paint, cosmetic, anti-blocking agent, catalyst support, and others in addition to the usage as a thermal insulating material.

The invention claimed is:

1. A sol composition for aerogel formation comprising: a hydrolysis product of a polysiloxane compound represented by the following formula (5),

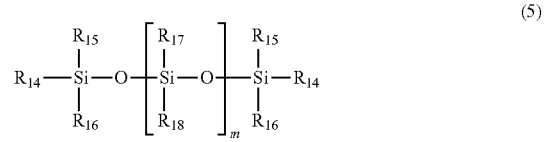

(5)

wherein $R_{14}$ represents an alkyl group or an alkoxy group, $R_{15}$ and $R_{16}$ each independently represent an alkoxy group, $R_{17}$ and $R_{18}$ each independently represent an alkyl group or an aryl group, and m represents an integer of 1 to 50.

2. The sol composition according to claim 1, wherein the number of carbon atoms of the alkoxy group is 1 to 6.

3. The sol composition according to claim 1, further comprising a hydrolysis product of a silicon compound having a hydrolyzable functional group within a molecule.

4. The sol composition according to claim 3, further comprising the silicon compound in unhydrolyzed form.

5. The sol composition according to claim 1, wherein the sol composition further contains a hydrolysis product of an alkyl silicon alkoxide.

6. The sol composition according to claim 5, further comprising the alkyl silicon alkoxide in unhydrolyzed form.

7. The sol composition according to claim 6, wherein the mass ratio of the content of the polysiloxane compound in unhydrolyzed form and the hydrolysis product of the polysiloxane compound to the content of the alkyl silicon alkoxide in unhydrolyzed form and the hydrolysis product of the alkyl silicon alkoxide is 1:0.5 to 1:4.

8. The sol composition according to claim 7, wherein the mass ratio 1:1 to 1:4.

9. The sol composition according to claim 1, further comprising the polysiloxane compound in unhydrolyzed form.

10. The sol composition according to claim 9, wherein a content of the hydrolysis product of the polysiloxane compound and the polysiloxane compound in unhydrolyzed form is 5 to 50 parts by mass with respect to 100 parts by mass in total of the sol composition.

11. The sol composition according to claim 9, further comprising one or more silicon compounds selected from methyltrimethoxysilane, dimethyldimethoxysilane, bistrimethoxysilylmethane, bistrimethoxysilylethane, bistrimethoxysilylhexane, ethyltrimethoxysilane, vinyltrimethoxysilane, a hydrolysis product of methyltrimethoxysilane, a hydrolysis product of dimethyldimethoxysilane, a hydrolysis product of bistrimethoxysilylmethane, a hydrolysis product of bistrimethoxysilylethane, a hydrolysis product of bistrimethoxysilylhexane, a hydrolysis product of ethyltrimethoxysilane, and a hydrolysis product of vinyltrimethoxysilane.

12. The sol composition according to claim 11, wherein the mass ratio of the content of the polysiloxane compound in unhydrolyzed form and the hydrolysis product of the polysiloxane compound to the content of the one or more silicon compounds is 1:0.5 to 1:4.

13. The sol composition according to claim 12, wherein the mass ratio is 1:1 to 1:4.

* * * * *